United States Patent [19]
Inoue et al.

[11] Patent Number: 5,994,864
[45] Date of Patent: Nov. 30, 1999

[54] ROBOT CONTROLLER

[75] Inventors: Yasuyuki Inoue; Hideo Nagata, both of Fukuoka, Japan

[73] Assignee: Kabushiki Kaisha Yaskawa Denki, Kitakyushu, Japan

[21] Appl. No.: 09/029,735

[22] PCT Filed: Sep. 10, 1996

[86] PCT No.: PCT/JP96/02574

§ 371 Date: Jun. 10, 1998

§ 102(e) Date: Jun. 10, 1998

[87] PCT Pub. No.: WO97/10081

PCT Pub. Date: Mar. 20, 1997

[30] Foreign Application Priority Data

Sep. 11, 1995 [JP] Japan .................................. 7-259231
Dec. 23, 1995 [JP] Japan .................................. 7-350570

[51] Int. Cl.[6] .................................................. G05B 19/04
[52] U.S. Cl. ........................................ 318/568.2; 318/591
[58] Field of Search ............................... 318/591, 568.2; 395/91

[56] References Cited

U.S. PATENT DOCUMENTS 4,985,668  1/1991  Nakazumi et al. ................... 318/568.2
5,241,250  8/1993  Nagasawa et al. ...................... 318/591

*Primary Examiner*—William M. Shoop, Jr.
*Assistant Examiner*—Rita Leykin
*Attorney, Agent, or Firm*—Oblon, Spivak, McClelland, Maier & Neustadt, P.C.

[57] ABSTRACT

A control apparatus and compliance control apparatus of a robot which performs operations while switching between a position control and a compliance control. When a transition from the position control to the compliance control is made, an integration operation of a speed control system is stopped. Thereafter, an integration value of the speed control system is stored in a memory, and, at the same time, the integration value is added to a torque reference. Alternately, a gravity compensation value is added to the torque reference, the gravity compensation value being computed based on a joint angle of a robot arm and a link mass and a position of a center of gravity of the robot. When the control returns from the compliance control to the position control, a present position is dealt with an instruction position. The compliance control apparatus includes a device (102) for controlling a torque of a servo motor to drive a joint portion; a device (106) for measuring a joint angle; a device (108) for computing a very small displacement between coordinates based on the measurement information; a device (102) for converting a limitation value (107) of either a force or a torque set in a working coordinate system by giving the foregoing very small displacement correspondence relation to the foregoing computation means (108); and devices (104, 105, 106) for limiting the torque.

19 Claims, 20 Drawing Sheets

1

2

3

4

5

6

ROBOT CONTROLLER

TECHNICAL FIELD

The present invention relates to a control apparatus for a robot which executes operations while switching between a position control and a compliance control.

Further, the present invention relates to a compliance control apparatus for a robot and the like, more particularly to a compliance control apparatus for a robot which is capable of limiting a developing force of a servo motor for driving joints based on set values for a force and a torque at a working coordinate system. More particularly, the present invention relates to a compliance control apparatus for a robot which is capable of flexibly following an external force when it is applied thereto, by limiting a gain of a position speed control system or by limiting a developing force of a servo motor for driving joints based on a torque limitation value. More particularly, the present invention relates to a compliance control apparatus which controls a gain of a position speed control system or limits a developing force of a servo motor for controlling joints by torque control, whereby changing a flexibility of a compliance control system in an instrument for controlling the robot for an external force. Furthermore, the present invention relates to a compliance control apparatus of a robot of a servo control which is capable of monitoring a servo deviation during compliance control of a robot and interrupting an operation or changing the kind of an operation to another when the operation is not performed normally.

BACKGROUND ART

FIG. 1 illustrates a position/speed control system of a motor which has been widely used in controlling joints of a robot. Reference symbol s denotes a Laplace operator.

In this position/speed control system, a speed control loop gain Kv111 and a position loop gain Kp110 is set to be as high as possible, in order to perform a positioning in opposition to friction and external force. Furthermore, an integrator 113 is arranged in parallel with a proportional operator 112 whereby control is performed so as to improve its characteristics. With such a control system, the tip of the robot can be accurately positioned at their target positions even under conditions of external force.

However, the foregoing robot has no ability to cope with usage for performing an operation while absorbing a strong force applied from the outside. For example, in a case where the conventional position control robot aims to work in operations to flexibly receive the force applied from an external machine and in the usage of holding and pushing of parts by the robot, the accomplishment of the operations will be difficult.

Specifically, when operations involving a contact with works are performed in such control system, an output value of a speed control loop, that is, a torque reference value becomes large thereby creating an over load state when a positional shift of the works occurs, due to a gain set to a large value in order to enhance rigidity and action of the integrator. Thus, the operation execution will be difficult. In order to cope with such problems, a force control system has been adopted, in which either a float instrument for absorbing the force of an action or an exclusive use instrument such as an RCC having a mechanical flexibility is provided in a tip of the robot, or a force sensor is employed [Prior art No. 1]. For a method of performing a compliance control without adding a special instrument to the robot, a method for reducing a servo gain has been disclosed in Japanese Patent Application Laid Open No. 6-332538 [Prior art No. 2, see FIG. 2]. Moreover, a method capable of setting the flexibility in an operation coordinate system has been disclosed in Japanese Patent Application No. 7-20941 [Prior art No. 3, not shown].

The prior art No. 2 concerns a flexible servo control method which moves a driven body by means of human power, the driven body being driven by a servo motor and is kept away from obstacles. In this method, when a compliance control starts, the position gain Kp110a and the proportional gain Kv112a of the speed control loop are lowered in accordance with the degree of setting flexibility. Further, the output from the integrator 113 of the speed control loop is limited to the value of a setting clamp. As a result, the torque reference will not have a specially large value in spite of an increase in the position deviation, so that the driven body to be driven by the servo motor can be moved by human power. The prior art No. 2 is a technology which is capable of moving the driven body while avoiding an obstacle by human power, in the case when an obstacle is in the movement path of the driven body.

The prior art No. 3 concerns a flexible servo control method which is capable of changing the gain of the servo system of the robot built in each of the coordinate axes by setting the flexibility on the working coordinates. In the control method of the servo motor controlled in the control system which comprises the position control loop and the speed control loop, the prior art No. 3 is a technology in which the flexibility designated on the working coordinates where the servo motor is positioned is converted to the servo gains Kp110a and Kv112a of the servo motor on each of the coordinate axes, the servo motor is driven by the servo gains Kp and Kv converted by the flexibility, and the body to be driven by the servo motor can be moved by human power.

Furthermore, there has been a compliance control system of a robot, in which a limitation to the output of the position speed control system is provided for reducing the loop gain, and the posture is changed when an external power more than a predetermined level is applied [Prior art No. 4, FIG. 3].

Besides, as recited in "Impedance Control of a Direct Drive Manipulator Using no Force Sensor", Tachi and Sakaki, Journal of Japan Robot Society, Vol. 7-3, 1989, pp. 172–184, in a control system, in which the position control loop, the speed control loop, and the acceleration control loop are independently provided, and the result obtained by adding them is used as the torque instruction for the motor, an impedance is controled by adjusting the gain of each of the loops, the impedance being a mechanical rigidity, a viscosity and a mass [Prior art No. 5, see FIG. 4].

The foregoing prior arts have the following drawbacks.

For the prior art No. 1 shown in FIG. 1, when transition from the position control to the flexible control is made, the robot is affected greatly by a force acting statistically to it, particularly, by gravity. Specifically, when the compliance function starts to operate, the robot arm drops in the direction of the gravity due to the action of the gravity, so that the robot changes greatly in posture, making execution of operations difficult. Moreover, when transition from the compliance control to the position control is made, there are problems that the robot arm drops in the direction of gravity or the response is unstable for a period during which values are accumulated in the integrator of the speed control system. Moreover, during compliance control, the value of the position instruction often does not agree with the present position of the robot. When the transition from the compliance control to the position control is made suddenly, the robot performs a rapid convergence to the position instruction value. Therefore, there are problems that the robot is very dangerous, for example, the robot collides with bodies around it and an unstable response is brought about due to hunting generated by the limitation of the integrator.

Furthermore, a plurality of servo gains for each of the axes which drive each of the axes of the robot must be adjusted to keep a certain relation. In addition, since an increase in the servo deviation creates a proportional increase in a generation torque of the servo motor, it is impossible to cope with machinery and the like which has a great stroke acting on the robot from the outside.

Furthermore, in a method in which an exclusive use jig and a force sensor are used together with other parts (not shown), there is a problem of higher cost.

In the prior art No. 2 shown in FIG. 2 and the prior art No. 3, the method for reducing the servo gains is adopted. It is required for these methods to adjust the plurality of servo gains while keeping a certain relation among them. Moreover, since an increase in the servo deviation creates a proportional increase in the generation torque of the servo motor, it is impossible to cope with machinery and the like with a great stroke acting on the robot from the outside.

Furthermore, in the prior art No. 3, a method which controls the flexibility in the working coordinate system is disclosed. In this method, it is required to obtain the gain by matching the displacement of the joint coordinate system to that of the working coordinate system. Therefore, since the computation load is large due to a complexity of the computation relation formula, it is impossible to continuously obtain the gain for changing the posture of the robot. Particularly, these is a problem that at the particular point where the robot makes a great change in its posture due to a large rate of change of the relation between the joint angle and the displacement in the operation coordinates, a computation load for a CPU is large, a real time computation can not be performed for the posture change of the robot, and the difficulty in the continuous computation of the gain forces the flexibility of the robot to be significantly different based on the posture of the robot.

Next, in the method of the prior art No. 2 shown in FIG. 2, which reduces the loop gain of the control system, although it is possible to perform the control for the rigidity and the viscosity in the mechanical impedance in the case where the robot is operated with an external force, it is impossible to reduce the mass of the arm inherently possessed by the robot and the mass quantity added to the tip of the robot. Therefore, it is impossible to reduce the reaction force exerted when the robot arm is accelerated by the external force, so that the flexibility to move the robot by a small force can not be realized.

The above-described problem is found also in the method of the prior art No. 4 shown in FIG. 3, in which an output limitation in the position and speed control systems is provided.

Moreover, in the method of the prior art No. 5 shown in FIG. 4 by Tachi and Sakaki, the switching between the conventional position and compliance control can not be easily made. Specifically, because of the difference between the constitutions of the control loops, it is difficult to switch between the position control and the compliance control while keeping the continuity of the quantity of state.

In the methods of the prior arts 1 to 5 shown in FIGS. 1 to 4, no protection means is provided when the robot is pushed from the outside and makes the displacement more than an allowed value.

For this reason, the robot has the following problems.

A. The robot is pushed by an external instrument, and the robot is moved to the outside of the operation region, resulting in collision with the instruments around it.

B. When the robot holds a body heavier than the prescribed value for handling, the robot changes its posture in the gravity direction, resulting in a problem similar to that recited in item A.

Moreover, in the prior arts 6 to 8, in order to effectively utilize the compliance control, no means for taking the following measures is provided.

C. The handling body is detected based on the displacement produced by the weight during handling, and the following operation plan is changed.

D. The collision with the body is detected, whereby the execution procedures for operations are changed.

Specifically, no means is provided for detecting the information to know whether the robot is in an abnormal state, the information indicating what level force acts on the robot, and what distance the robot shifts from the track to the target due to force. Therefore, when the robot receives a force from the outside for making displacement flexibly, it is impossible to execute the measures such as stopping the robot, stopping the external instruments, and changing the movement schedule of the robot.

Moreover, similarly, in the prior arts 1 to 5, in the case where the operator comes into contact with the moving robot, the operator is caught between the arms of the robot, or the robot comes into contact with other bodies, the deviation between the instruction of the position and speed control systems and the detection value becomes large. Therefore, the robot continues to move in a direction where a more dangerous situation is produced. It is very difficult for the operator to escape from such a dangerous situation, and damage to the robot and other bodies may results.

DISCLOSURE OF INVENTION

The first object of the present invention is to provide a control apparatus of a robot which is capable of achieving a smooth switching between the position control and the compliance control during operation of the robot without being significantly affected by gravity.

The second object of the present invention is to provide a compliance control apparatus of a robot which is capable of performing a flexibility setting for plus and minus variables with one degree of freedom and making a displacement by a large stroke, and, in addition, of performing compliance control in working coordinate system by a simple coordinate conversion.

Furthermore, the third object of the present invention is to provide a compliance control apparatus of a robot which is capable of obtaining more flexibility in the compliance control of the robot which follows an external force applied to it, either by limiting gains of the position and speed control systems or by limiting a generation force of the servo motor for driving joints based on a torque limitation value.

Further, the fourth object of the present invention is to provide a compliance control apparatus of a robot which is capable of following an external force flexibly upon its application, particularly, to provide means which limits a generation force of the servo motor to drive joints by limiting gains of the position and speed control systems or a torque thereof, forces the robot to be flexibly controlled for an external force, and monitors whether operations are performed normally with safety.

Still further, the fifth object of the present invention is to provide a compliance control apparatus of a robot which is capable of securing the safety of the operator and the robot, even when the operator makes contact with the operating robot during compliance control, the operator is caught between the arms of the robot, or the robot makes contact with other bodies.

The present invention is constituted of the following means for solving the above described problems.

Specifically, in order to achieve the first object, a robot is provided comprising means for switching between position control and compliance control during the operation of the robot, wherein when the transition from the position control to the compliance control is made, an integration operation of the speed control system is stopped, an integration value of the speed control system is subsequently stored in a memory and, at the same time, the integration value is added to a torque reference or a gravity compensation value computed based on a joint angle of a robot arm, a link mass of the robot and the center of gravity thereof is added to the torque reference.

The control apparatus of a robot is characterized in that in the operation of the robot to hold a workpiece, a mass of the workpiece is added to the foregoing gravity compensation value.

Further, the control apparatus of a robot is characterized in that when a transition from the compliance control to the position control is made, a present position is handled as an instruction position.

Still further, the control apparatus of a robot is characterized in that when the transition from the compliance control to the position control is made, either a gravity compensation value computed based on a link mass of the robot and a position of a center of gravity thereof or an integration value of the speed control system stored in the foregoing memory is set as a new integration value of the foregoing speed control system.

The control apparatus of a robot is characterized in that the switching between the foregoing position control and the foregoing compliance control is also performed by limiting an output value of the speed control system, that is, the torque reference value.

By the foregoing means, a smooth switching between both controls can be achieved without being greatly affected by gravity.

In order to achieve the second object, a compliance control apparatus of a robot of the present invention comprises means for controlling a torque of a servo motor which drives a joint portion of the robot; means for measuring a joint angle; means for computing a very small displacement relation between coordinate systems, which are generally called Jacobian, based on information of the measured joint angle; means for converting either a force set in an working coordinate system or a limitation value of the torque to a joint torque limitation value by use of a Jacobian's by a force acting from the outside; and means for limiting an output torque of the robot by use of the torque limitation value, wherein a flexibility setting for plus and minus variables with one degree of freedom can be performed, a displacement of a large stroke is possible, and a compliance control at a working coordinate system with a simple coordinate conversion can be performed.

In order to achieve the third object, means is provided, which is capable of varying position and speed control gains in a control system of a servo motor and feedback control means is provided, which limits an output of an integrator at a proportional integration control of a speed control loop, adds an acceleration of the servo motor multiplied by a constant to a torque reference which is a rear stage of a speed control gain multiplier, and produces an output therefrom as a new torque reference; means for limiting the foregoing torque reference to a predetermined value is provided and feedback control means is provided, which multiplies the acceleration of the servo motor by a constant to output a new torque reference. When an external force is applied to the robot, a compliance control apparatus of a robot which follows the applied force flexibly can be obtained.

In order to achieve the fourth object, a compliance control apparatus of a robot comprises means for comparing a deviation between an angle reference value and a present angle in a position control system with a setting value to stop a servo motor based on the comparing result, for outputting a signal to the outside, for changing an operation schedule of a servo system, for obtaining a deviation in a working coordinate system, for changing a flexibility of a flexible coordinate system, and for equalizing an operation coordinate system to a coordinate system of a setting value to be compared so that the setting value can be easily set.

In order to achieve the fifth object, in a control system of a servo motor which drives a joint portion of a robot having a position control loop and a speed control loop, means is provided which is capable of varying a position control gain and a speed control gain; means is provided which is capable of varying the position control gain and the speed control gain to other states based on reference information and detection information concerning position, speed and direction, and a computation result using the foregoing information; means is provided which limits a torque reference that is an addition result obtained by adding a proportional control to an output of an integrator; and means is provided which is capable of varying the foregoing torque limitation based on the instruction information and the detection information concerning the position, the speed and the direction, and the computation result using the foregoing information. Even when an operator comes into contact with the operating robot during compliance control, the operator is caught by arms of the robot, or the robot comes into contact with other bodies, a compliance control apparatus of a robot secures the safety of the operator and the robot.

One compliance control apparatus of the present invention comprises means for controlling a torque of a servo motor which drives a joint portion of the robot; means for measuring a joint angle of the foregoing joint portion; means for computing a static torque relation changed by a posture of the robot between coordinate systems based on information of the foregoing joint angle obtained by the foregoing measurement; means for converting a limitation value of either a force or a torque set in a working coordinate system to a joint torque limitation value by use of a correspondence relation of the foregoing static torque relation; and means for limiting an output torque of the servo motor which drives a joint portion of the robot using the foregoing joint torque limitation value, wherein the force and torque in the working coordinate system are converted to a limitation value of a torque in a joint coordinate system, thereby obtaining a function of the compliance control apparatus of the robot to perform a flexible movement for a force in the working coordinate system, applied from the outside, greater than a limitation value.

A further feature, which obtains the foregoing static torque relation changed by a posture of the robot relation between the foregoing working coordinate system and the joint coordinate system, using a reference value of the foregoing joint angle of a control system of the servo motor driving a joint portion of the robot, thereby achieving a function to make it possible to perform compliance control in the working coordinate system with simple coordinate conversion using information of a position of the foregoing joint angle.

In a compliance control apparatus of a robot which comprises a control system of a servo motor to drive a joint portion of the robot having a position control loop and a speed control loop, the another embodiment of the present invention comprises means for varying a position control gain and a speed control gain; means for limiting an output of an integrator at a proportional integration control in the foregoing speed control loop; means for obtaining a rotation acceleration of the servo motor either by detection or by computation; and feedback control means for multiplying an acceleration of the foregoing servo motor by a constant at a rear stage of a speed controller multiplication.

A further feature is a function in which when an external force acts on a robot in a first method, the posture of a robot begins to deviate from a position reference so that position and speed deviations will be created. However, outputs of a position control gain, a speed control gain and an integrator are so small that a torque reference is forced to be low, thereby moving a robot arm in a direction of an external force. At this time, an acceleration of a motor obtained by a computation and the like is multiplied by a constant and the multiplied value will be added to the foregoing torque reference, a torque of the motor is produced in accordance with an acceleration when the robot is moved by the external force, so that an inertia changes apparently, a compensation torque is produced in a direction of an addition in the movement direction of the robot in the compliance control, and the robot can be moved by the external force with a sensibility lighter than the actual inertia possessed by an arm, thereby increasing flexibility.

In a compliance control apparatus of a robot which comprises a control system of a servo motor to drive a joint portion of the robot having a position control loop and a speed control loop, an embodiment of the present invention is a compliance control apparatus of a robot which comprises means for controling an output of an integrator in a proportional integration control in the foregoing speed control loop; a torque limiter for limiting a torque reference that is an addition result obtained by adding an output of the foregoing integrator and that of a proportional control; means for obtaining a rotation acceleration of the foregoing motor, either by detection or by computation; and feedback control means to multiply an acceleration of the foregoing servo motor by a constant in a rear stage of the foregoing torque control limiter, and flexibility of the robot is increased.

A further feature comprises means for compensating a torque reference which is a result obtained by adding an output of a speed controller and an integration control for either a gravity torque or a friction torque, wherein dropping in the gravity direction never occurs in spite of various changes in the posture of the robot, thereby increasing the flexibility.

A further feature comprises means for compensating a torque reference which is a result obtained by adding an output of a speed controller and an integration control for either a gravity torque or a friction torque, wherein dropping in the gravity direction never occurs in spite of various changes in the posture of the robot, thereby increasing the flexibility.

A further embodiment of the present invention is a compliance control apparatus of a robot which comprises means for comparing a setting value with a difference between a target angle of a position and a present angle of the foregoing servo motor; and means for stopping a movement of the foregoing servo motor based on the comparison result.

A further feature includes function in which when a value of a position deviation is larger than a setting value, it is not judged that the present state is safe, and the robot is forced to stop the movement immediately.

In a compliance control apparatus of a robot which comprises a control system of a servo motor of a robot having a position control loop and a speed control loop, another embodiment of the present invention is a compliance control apparatus of a robot which comprises means for comparing a predetermined fixed angular deviation quantity threshold with a difference between a target angle of a position and a present angle of the foregoing servo motor; and means for stopping a movement of the foregoing servo motor based on the comparison result, wherein when a value of a position deviation is larger than a predetermined fixed angular deviation quantity threshold, a signal is sent to a peripheral equipment of the compliance control apparatus of a robot using an input/output contact to stop a peripheral equipment of the compliance control apparatus of a robot, for example.

In a control apparatus of a robot which comprises a control system of a servo motor of a robot having a position control loop and a speed control loop, another embodiment of the present invention is a compliance control apparatus of a robot which comprises means for comparing a predetermined fixed angular deviation quantity threshold with a difference between a target angle of a position and a present angle of the foregoing servo motor; and means for changing a processing of a servo control based on the comparison result, wherein branching of a condition for robot software is performed based on information of a position deviation.

In a compliance control apparatus of a robot which comprises a control system of a servo motor of a robot having a plurality of position control loops and speed control loops, a further embodiment of the present invention is a compliance control apparatus of a robot which comprises means for comparing a setting value with a difference between a target value in an operation coordinate system and a present value in the operation coordinate system obtained form a present value of the foregoing servo motor; and means for stopping a movement of the foregoing servo motor based on the comparison result, wherein the servo motor can be stopped based on a present position in the operation coordinate system.

A further embodiment of the present invention is a compliance control apparatus of a robot which comprises means for comparing a setting value with a difference between a target value in a working coordinate system and a present value in the working coordinate system obtained from a present value of the servo motor; and means for outputting the comparison result from a servo instrument to an external instrument, wherein when a value of a position deviation is larger than the setting value in the control system comprising the plurality of position control loops and speed control loops, a signal is sent to an external instrument using an input/output contact to stop an external instrument, for example.

In a compliance control apparatus of a robot which comprises a control system of a servo motor of a robot having a plurality of position control loops and speed control loops, a further embodiment of the present invention is a compliance control apparatus of a robot which comprises means for comparing a setting value with a difference between a target value in a working coordinate system and a present value in the working coordinate system obtained from a present value of the servo motor; and means for changing a processing of a servo control based on the computation result, wherein even in the control system comprising the plurality of position control loops and speed control loops, branching of a condition for a robot software is performed based on information of a position deviation.

In a compliance control apparatus of a robot which comprises a control system of a servo motor to drive a joint portion of the robot having a position control loop and a speed control loop, yet another embodiment of the present invention is a compliance control apparatus of a robot which comprises means for changing a position control gain and a speed control gain; and means for converting the foregoing position control gain and the foregoing control gain to other states based on reference information concerning a position, a speed and a direction, detection information, and a computation result using the foregoing information, wherein the safety of an operator and the robot is secured.

In a compliance control apparatus of a robot which comprises a control system of a servo motor to drive a joint portion of the robot having a position control loop and a speed control loop, another embodiment of the present invention is a compliance control apparatus of a robot which comprises means for limiting a torque reference that is an addition result of outputs of a proportional control and an integrator; and means for changing the means for limiting the foregoing torque instruction based on a computing result using instruction information concerning a position, a speed and a direction, detection information and the foregoing information, wherein the torque reference is further controlled to be lower by changing the foregoing position control gain and the foregoing speed control gain from the computing result using the reference information, the detection information and the foregoing information, thereby securing the safety of an operator and the robot.

A further feature includes means for compensating either a gravity or a friction torque after adding means for adding a proportional control and an integration control in the foregoing speed control loop, wherein dropping in the gravity direction is prevented in spite of various changes of a posture of the robot by compensating either a gravity or a friction torque, and the safety of an operator and the robot can be secured collectively by changing the foregoing torque control, when the operator comes into contact with other bodies or is caught between arms of the robot or when the robot comes into contact with other bodies.

A further feature includes means for compensating either a gravity or a friction torque after adding means of proportional control and integration control in the foregoing speed control loop, wherein dropping in the gravity direction is prevented in spite of various changes of the posture of a robot by compensating either a gravity or a friction torque, and the safety of an operator and the robot can be secured collectively by changing the foregoing torque control, when the operator comes into contact with other bodies or is caught between arms of the robot or when the robot comes into contact with other bodies.

BEST MODE FOR CARRYING OUT THE INVENTION

Figure 1:
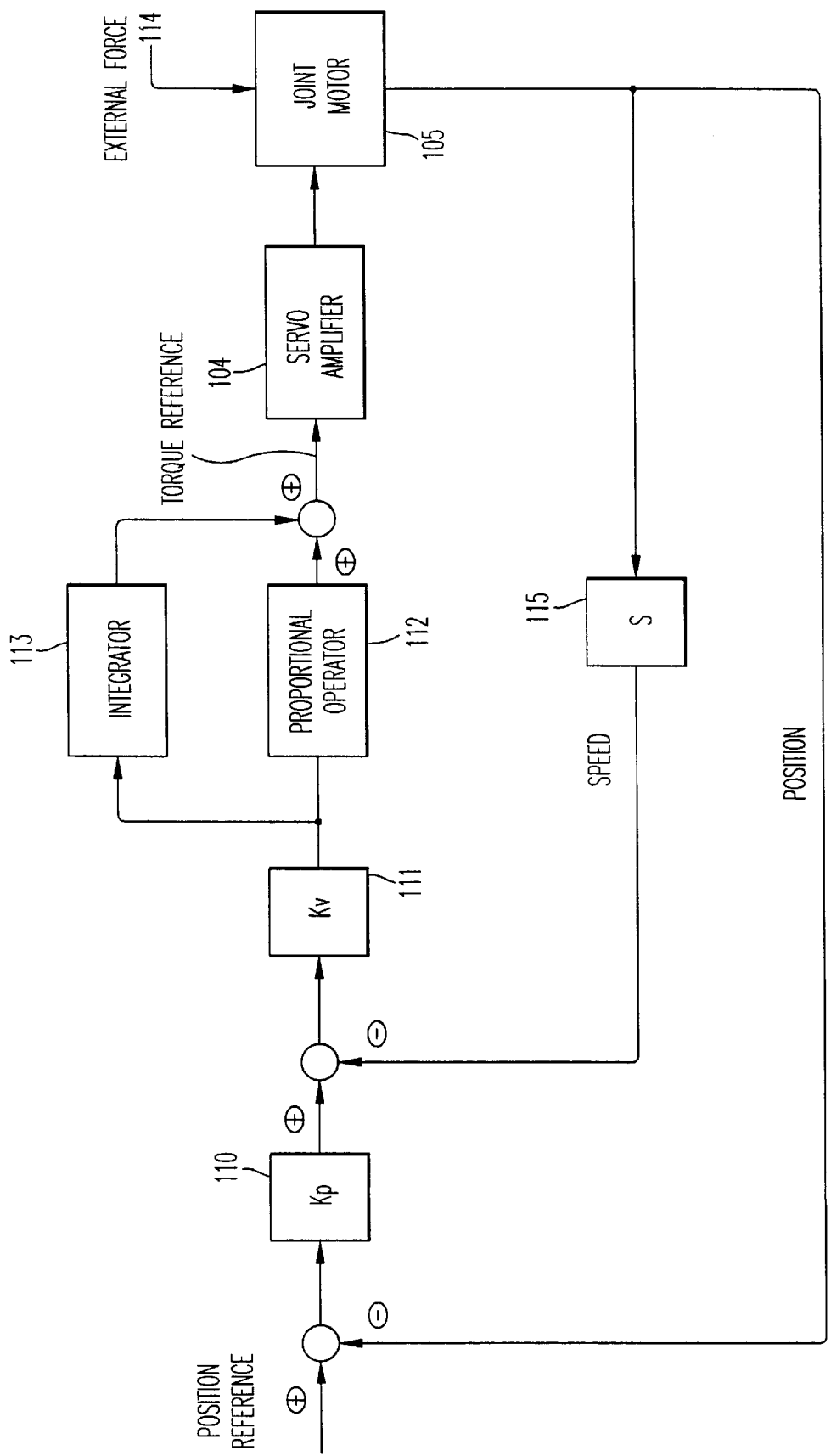
FIG. 1 is a block diagram showing a circuit constitution of a prior art No. 1.

Next, embodiments of the present invention will be described with reference to the accompanying drawings.

In the drawings, the same reference symbols denote same components or equivalent components.

(Embodiment No. 1)

Figure 5:
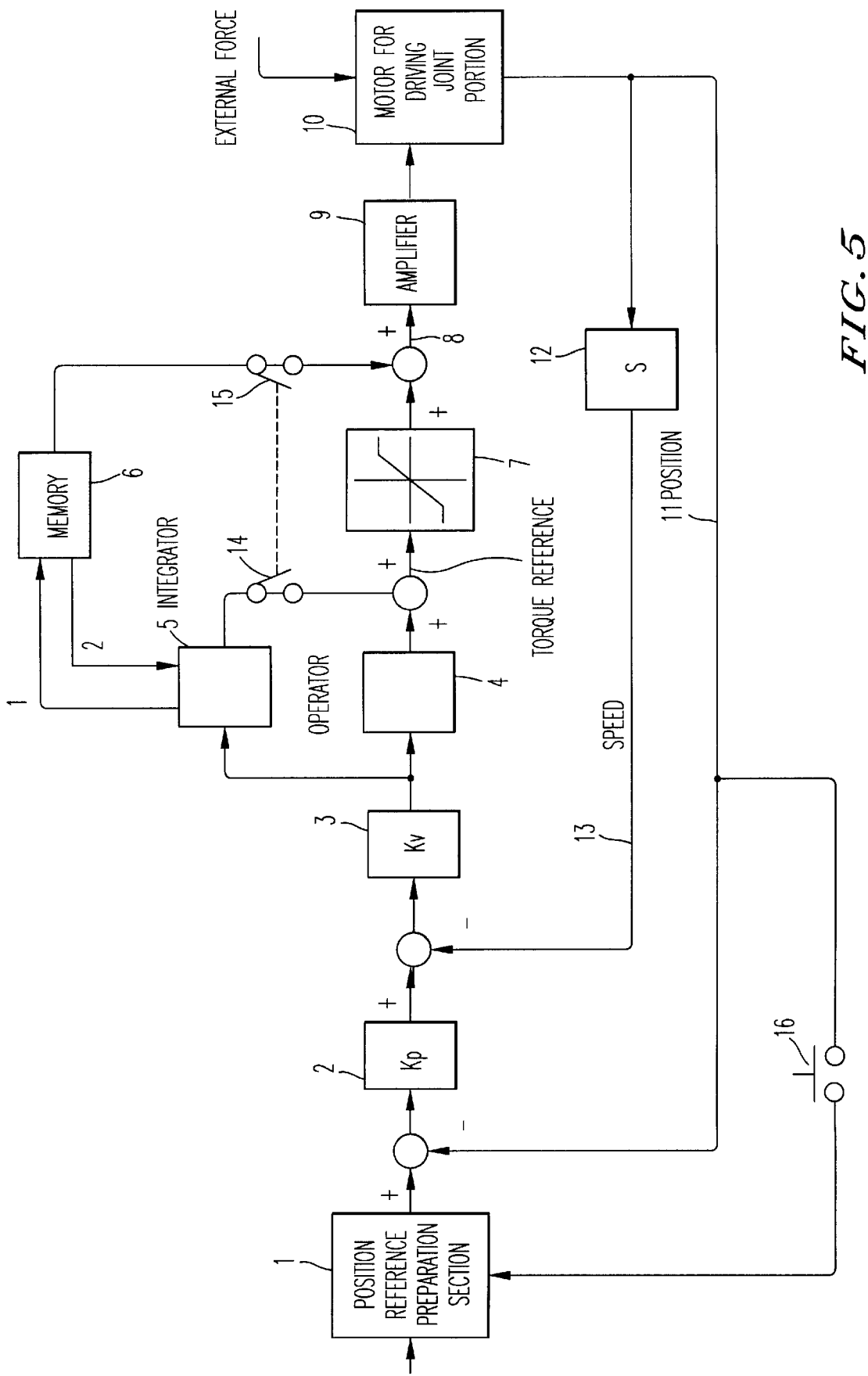
FIG. 5 is a block diagram showing a concrete circuit constitution in a first embodiment of the present invention.

FIG. 5 shows a first embodiment of the present invention.

Referring to FIG. 5, reference numeral 1 denotes a position reference preparation section; 2, a position loop gain; 3, a speed loop gain; 4, an operator; 5, an integrator; 6, a memory; 7, a limiter; 8, a torque reference; 9, an amplifier; 10, a motor for driving each joint portion; 11, a motor position; 12, a differentiator; 13, a motor speed; and 14 to 16, a switch.

In this control system, during a position control, the position control is conducted in the state where the switch 14 is closed, and the switch 15 is opened. In the case where an acceleration torque is close to zero in a speed control loop of the position control, a value stored in the integrator 5 is equal to a force steadily acting on an arm. Therefore, in a control system of a robot arm which makes no rapid movement, a value of the integrator 5 is equal to that obtained by adding a friction force and the gravity. Accordingly, in the case where a transition from the position control to a compliance control is made, the transition can be done with a compliance characteristic and continuity while keeping a gravity balance, by storing this value in the memory 6 and by adding it to the rear stage of limiter 7 and compensating it as a compensation torque of the compliance control.

During a compliance control, control is conducted in a state where the switch 14 is opened and the switch 15 is closed. When compliance control is conducted, a torque limit is reduced, whereby a compliance characteristic can be brought about for an external force. Alternately, the well known gain may be reduced instead of reducing the torque limit. The gravity is compensated by the value stored in the memory.

When a transition from the compliance control to the position control is made, the value of the memory 6 having been stored at the time of the switching to the compliance control is set as an initial value of the integrator 5. When the quantity of a shape change of the robot after the transition from the position control to the compliance control is not large, the integration value change is small, so that the transition to the position control is made smoothly.

The present invention has a feature in that by recreating the position reference the present value simultaneously, that is, by closing the switch 16, the transition between both controls can be performed stably without a rapid movement of the robot.

Next, an operation of the present invention will be described by showing a concrete embodiment of a robot of two degrees of freedom in FIG. 6. A control system is the same as that of the first embodiment.

Figure 6:
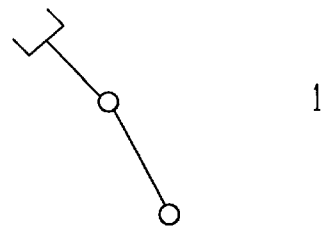
FIG. 6 is a drawing for explaining an operation in the first embodiment of the present invention.
Figure 6:
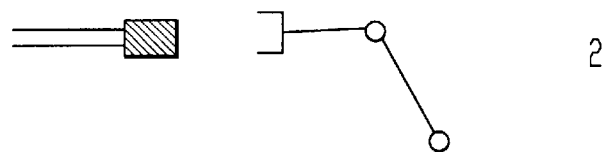
Figure 6:
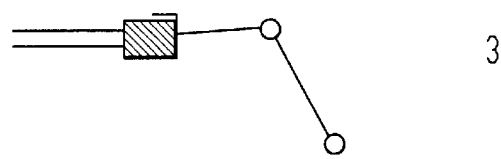
Figure 6:
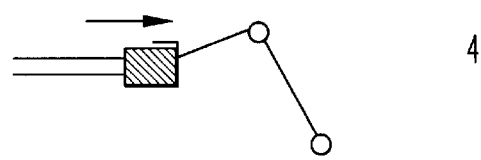
Figure 6:
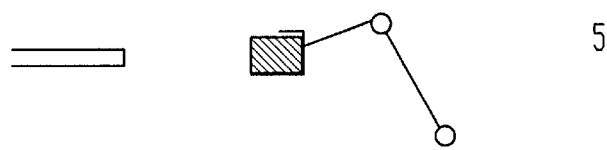
Figure 6:
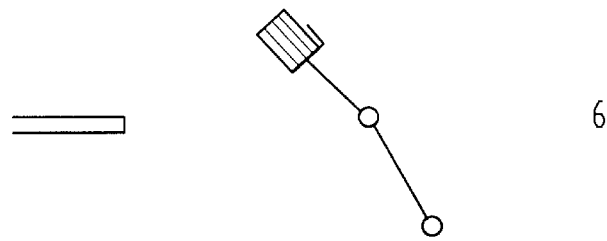

FIG. 6 shows a positional relation between the robot and a body applying a force on the robot and a control method of the robot. A symbol ① denotes an operation state in the position control; a symbol ②, a state where a transition from the position control to the compliance control is made; a symbol ③, a state where the body collides with the robot during the compliance control; a symbol ④, a state where the robot is pushed by the body during the compliance control; a symbol ⑤, a state where a transition from the compliance control to the position control is made; and a symbol ⑥, a state where the robot is moved during the position control.

In the position control, the speed control system executes an ordinary proportional integration control (state ①).

Before the transition to the compliance control, the integration value is stored in the memory so that the integrator is made ineffective, thereby switching the limiter to be a low level state (state ②).

While the robot is being pushed by the body, no integration control is performed. The value equal to the weight of the arm is compensated by the value of the memory. Moreover, the limiter of the torque is suppressed to be smaller than usual. When the force applied from the outside to the arm is larger than the torque generated by the motor, the arm is moved by the force from the outside (states ③ and ④).

When returning to the position control, the value stored in the memory is set as an initial value of the integration, and, at the same time, a present value of an encoder is replaced with a reference value:

1) when the action of the external force disappears and the robot is approaching its original posture, that is, when the transition to the position control is made, 2) when the external force acts on the robot continuously so that it is in a posture changing state, that is, when the transition to the position control is made during the state ④, since the position reference in the state 1) is the value before the force acts on the robot, the robot approaches the position where the robot exists before the external force acts on it and stops there, by the deviation from the present value. However, the robot is in a rest state with a considerable deviation due to the friction force in an ordinary control state. Therefore, by regenerating the present value of the encoder as the reference value, the smooth transition to the position control can be performed without the rapid movement of the arm.

Also in the state 2), by making the transition to the position control after remaking the position reference, the continuous transition to the position control can be performed in the state where the body is in contact with the arm.

As described above, an example where the robot is moved by force acting on it from the outside is described in FIG. 6. When the robot changes its posture while moving and applying a force to the outside in the compliance control state, the same operation procedures will be performed.

(Embodiment No. 2)

Figure 7:
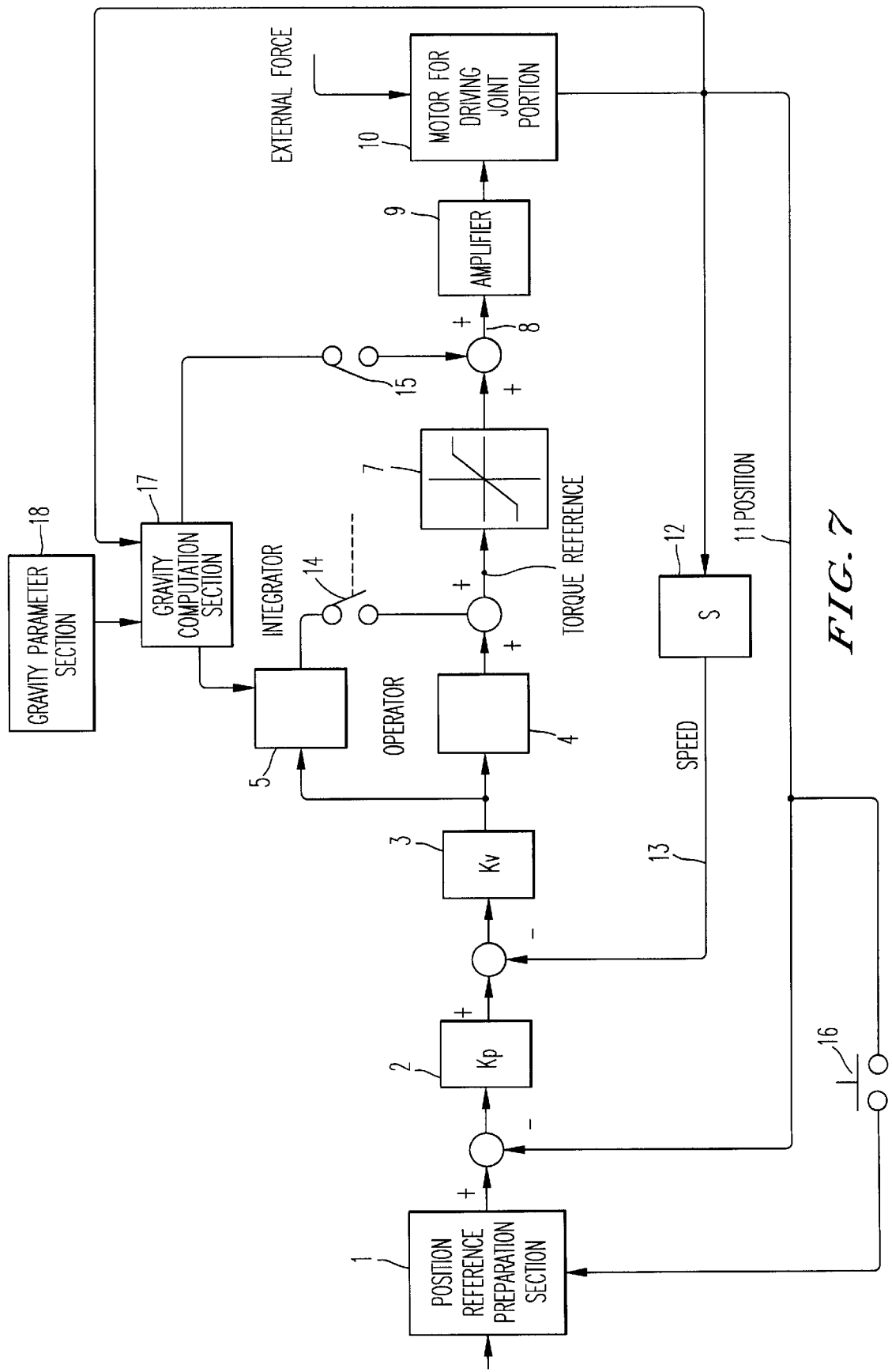
FIG. 7 is a block diagram showing a concrete circuit constitution in a second embodiment of the present invention.

Also in the first embodiment, although the gravity is compensated for the present, a second embodiment for compensating the gravity by a computation actively is shown in FIG. 7. Referring to FIG. 7, reference numeral 17 denotes a gravity computation section and a reference numeral 18 denotes a gravity parameter section. The gravity is previously obtained by measurements, and it is computed from the gravity parameter stored in the gravity parameter section 18 (a link mass of the robot and a position of a center of gravity) and the measurement value of the present joint angle of the robot arm, by means of the gravity computation section 17. When the transition from the position control to the compliance control is made, the switch 14 is opened and the switch 15 is closed, thereby transition from the integration compensation to the compensation of the gravity computation value which is added to the rear stage of limiter 7 is made. In the first embodiment, the compensation value is fixed. In this embodiment, the compensation value changes according to the present joint angle of the robot arm so that accuracy is increased. On the contrary, when the transition from the compliance control to the position control is made, the gravity computation value at that time is set as an initial value of the integrator 5. Moreover, the position reference value is remade by the present value by closing the switch 16 similar to the case of the first embodiment so that the transition to the position control is made smoothly. When the robot holds a body of a large mass during the compliance control, the integration value is set including a value equal to the weight of the body received by the robot as a gravity compensation value.

(Embodiment No. 3)

The third embodiment concerns means for computing a static torque relation changed by a posture of the robot between the joint coordinate system and the working coordinate system, from the measurement information of the joint angle of the robot, and for obtaining the joint torque limitation value from the force limitation setting value of the working coordinates.

Figure 8:
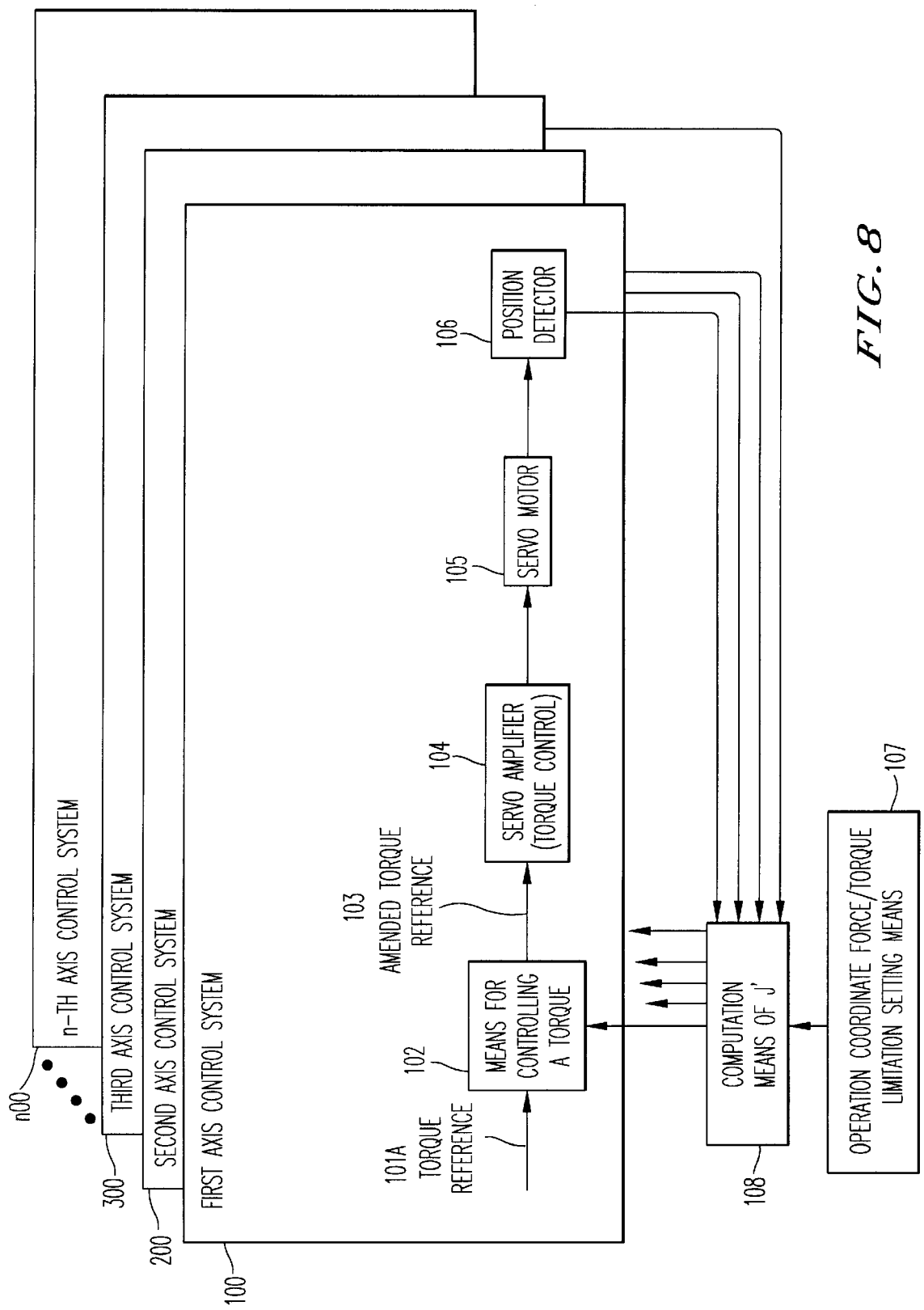
FIG. 8 is a drawing showing a circuit constitution which illustrates one concept for a second operation in an embodiment of the present invention.

FIG. 8 shows a circuit constitution illustrating one concept of an operation in the third embodiment of the present invention.

Figure 9:
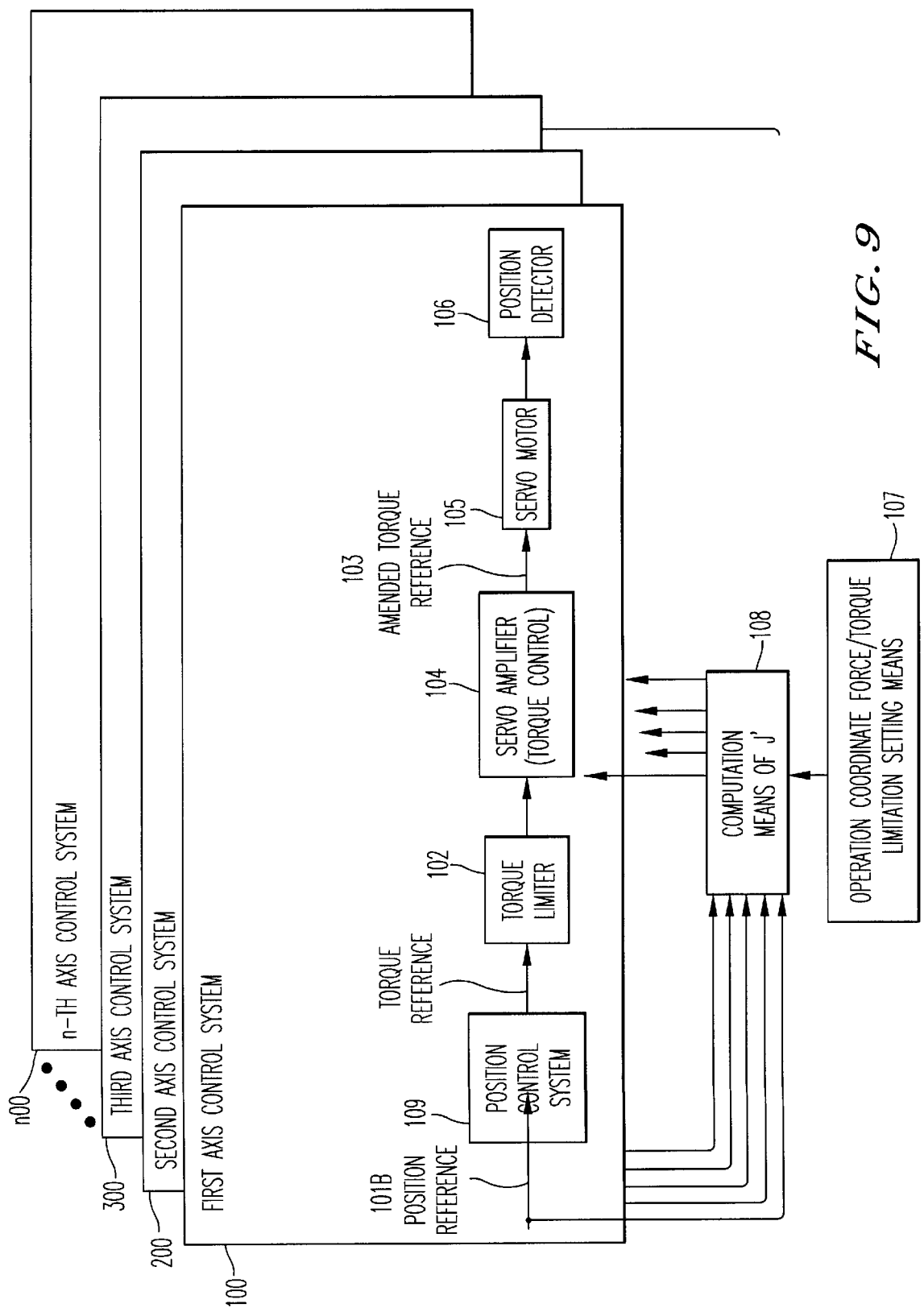
FIG. 9 is a drawing showing a circuit constitution which illustrates another concept in the second embodiment of the present invention.

Moreover, FIG. 9 shows a circuit constitution illustrating another concept in the third embodiment of the present invention.

Referring to FIGS. 8 and 9, reference numeral 100 denotes a first axis control system; 200, a second axis control system; 300, a third axis control system; n00, an n-th axis control system; 101a, a torque reference; 101b, a position reference; 102, a torque limiter; 103, an amended torque reference; 104, a servo amplifier (torque control); 105, a servo motor; 106, a position detector; 107, operation coordinate force/torque limitation setting means; and 108, computation means for Jacobian's transposed matrix.

A concrete embodiment of the present invention will be described with reference to FIG. 10.

Figure 10:
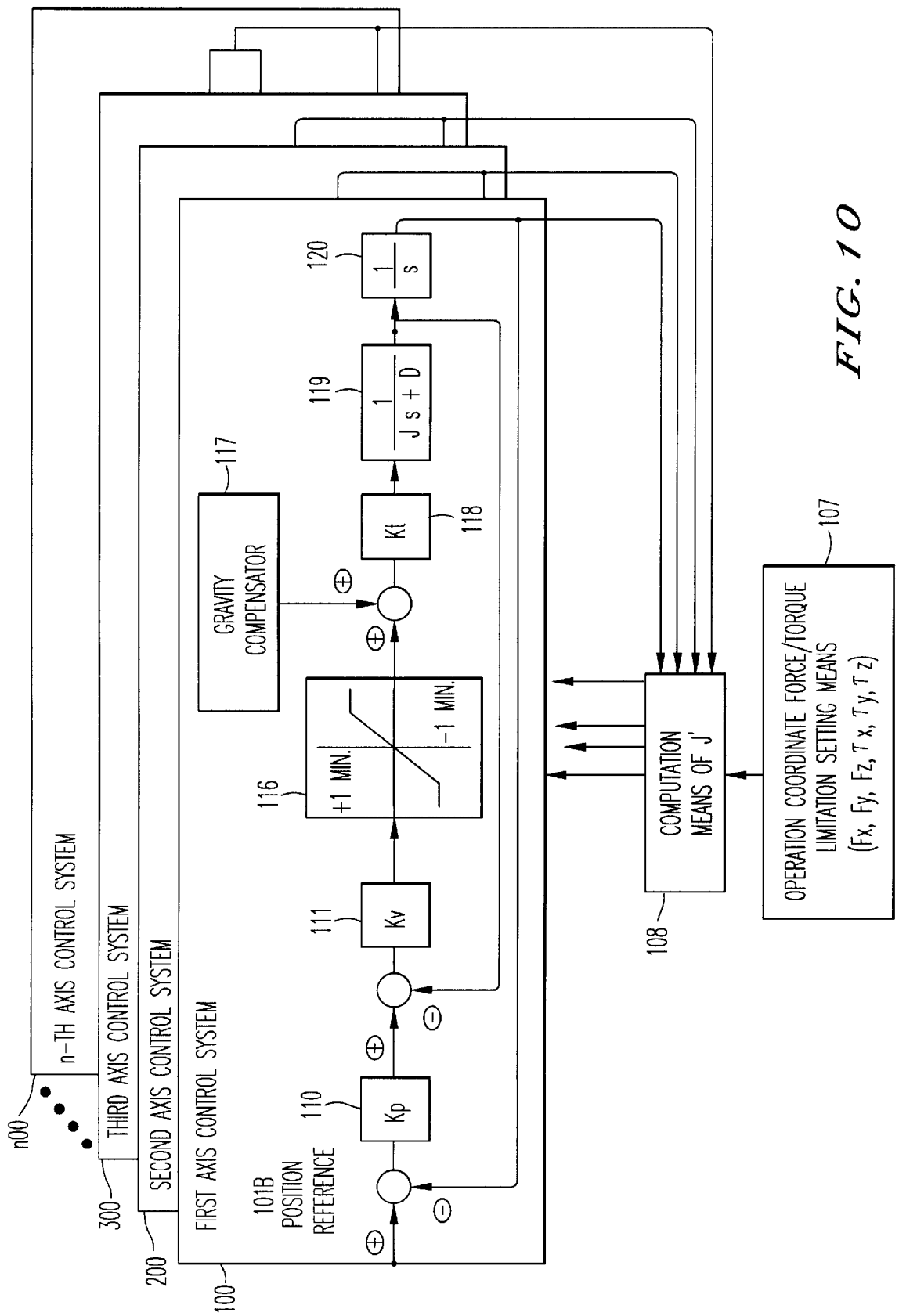
FIG. 10 is a block diagram showing a concrete circuit constitution in the second embodiment of the present invention.

FIG. 10 is a block diagram illustrating a concrete circuit constitution.

Referring to FIG. 10, reference numeral 110 denotes a position control gain [Kp] circuit; 111, a speed control gain [Kv] circuit; 116, a torque limiter; 117, a gravity compensator; 118, a torque conversion constant circuit; 119, a robot (J: an inertia, s: a Laplacian, and D: a dynamic friction coefficient); and 120, an integration circuit which shows a speed and a speed relation.

FIG. 10 in this embodiment No. 3 shows a control block diagram when the compliance control system is applied to the conventional control system (the prior art No. 1 of FIG. 1). For the internal loop of the position control, a proportional integration control is usually performed, and the force such as the gravity constantly acting on the robot shall be compensated by a static force compensation element.

In the position control state, the movement by a force acting from the outside has no tendency to occur by operations of the position control loop and the speed control loop. This is because the deviation from the reference value is multiplied by the force applied from the outside by a large gain which is set to be large, thereby generating a motor torque.

Here, a limitation to the generation torque is made at the stage of the torque reference, whereby the robot can operate flexibly for the force acting from the outside. Specifically, when a torque larger than that limited is applied from the outside, the joint of the robot will begin to move. Moreover, the limitation value of the torque set in this stage is the limitation value of the torque at the joint coordinate system. Therefore, the limitation to the force at the operation position on the top changes based on the posture of the robot.

Accordingly, the present state of the robot is detected, the static torque relation changed by a posture of the robot between the joint coordinate system generally called Jacobian and the working coordinate system is obtained, thereby computing the transposed matrix. Thus, it is possible to compute from the limitation value of the force in the working coordinate system the limitation value of the torque in the joint coordinate system.

For example, the Jacobian's transposed computation formula and the like in the robot of 6 degrees of freedom is expressed by the (1) to (4) formulas shown by the following equations 1.

For example, the computation formula of the Jacobian's transposed matrix for a robot of 6 degrees of freedom is expressed by the following equation.

$$J^T = \begin{pmatrix} {}^0S_1 \times ({}^0Pr - {}^0P_1), & {}^0S_2 \times ({}^0Pr - {}^0P_2), & \ldots, & {}^0S_6 \times ({}^0Pr - {}^0P_6) \\ {}^0S_1, & {}^0S_2, & \ldots, & {}^0S_6 \end{pmatrix}^T \quad (1)$$

In the above described formula, $J^T$ denotes a Jacobian's transposed matrix (correspondence relation of a very small displacement between a working coordinate system and a joint coordinate system); ${}^0S_1$, a rotation direction vector of first joint coordinates (using a base coordinate system as a reference); ${}^0P_1$, a first joint position vector (using base coordinates as a reference); ×, a vector product; and r, a tip effect device.

Therefore, the force and torque limitation value in the working coordinate system are expressed by the following formula (2).

$$F\ \text{lim} = [Fx, Fy, Fz, \tau_x, \tau_y, \tau_z]^T \quad (2)$$

where F lim denotes a force and torque limitation vector; F, a force in the working coordinate system; τ, a torque around the working coordinate system.

A limitation value in the joint control system is expressed by the following formula (3).

$$\tau\ \text{lim} = [\tau_1, \tau_2, \tau_3, \tau_4, \tau_5, \tau_6]^T \quad (3)$$

where τ lim denotes a torque limitation vector of a joint angle, and $\tau_i$ denotes a torque of the joint coordinate system in an i-th axis (i: an arbitrary positive integer).

The torque limitation value of the joint control system can be obtained from the following relation.

$$\tau\ \text{lim} = J^T F\ \text{lim} \quad (4)$$

For the changes of the posture of the robot, the computations using the formulas (1) and (4) are performed, and the limitation value of the joint torque is normally obtained, whereby the compliance control of the robot having the force shown in the formula (2) and the limitation value of the torque can be conducted all over the operation region.

Further, the formula (1) is a value changed by the posture of the robot, and it may change rapidly near a particular point. However, generally, the values of elements change slowly compared to a sampling speed of a CPU which performs a computation for the servo. Therefore, it is possible to suppress a computation load of the formula (1) to be small, and to perform a real time computation accompanied with the posture change of the robot.

The flexibility in the working coordinate system is determined only by the limitation value of the formula (2). Specifically, the flexibility can be controlled by determining two variables of plus and minus for the one degree of freedom. Moreover, the force and torque exerted by the robot are never in proportion to the displacement, so that the robot can change flexibly in cases where strokes of machinery acting from the outside are large.

(Embodiment No. 4)

The fourth embodiment of the present invention concerns a system in which an acceleration control loop is added to the conventional compliance control system.

Figure 2:
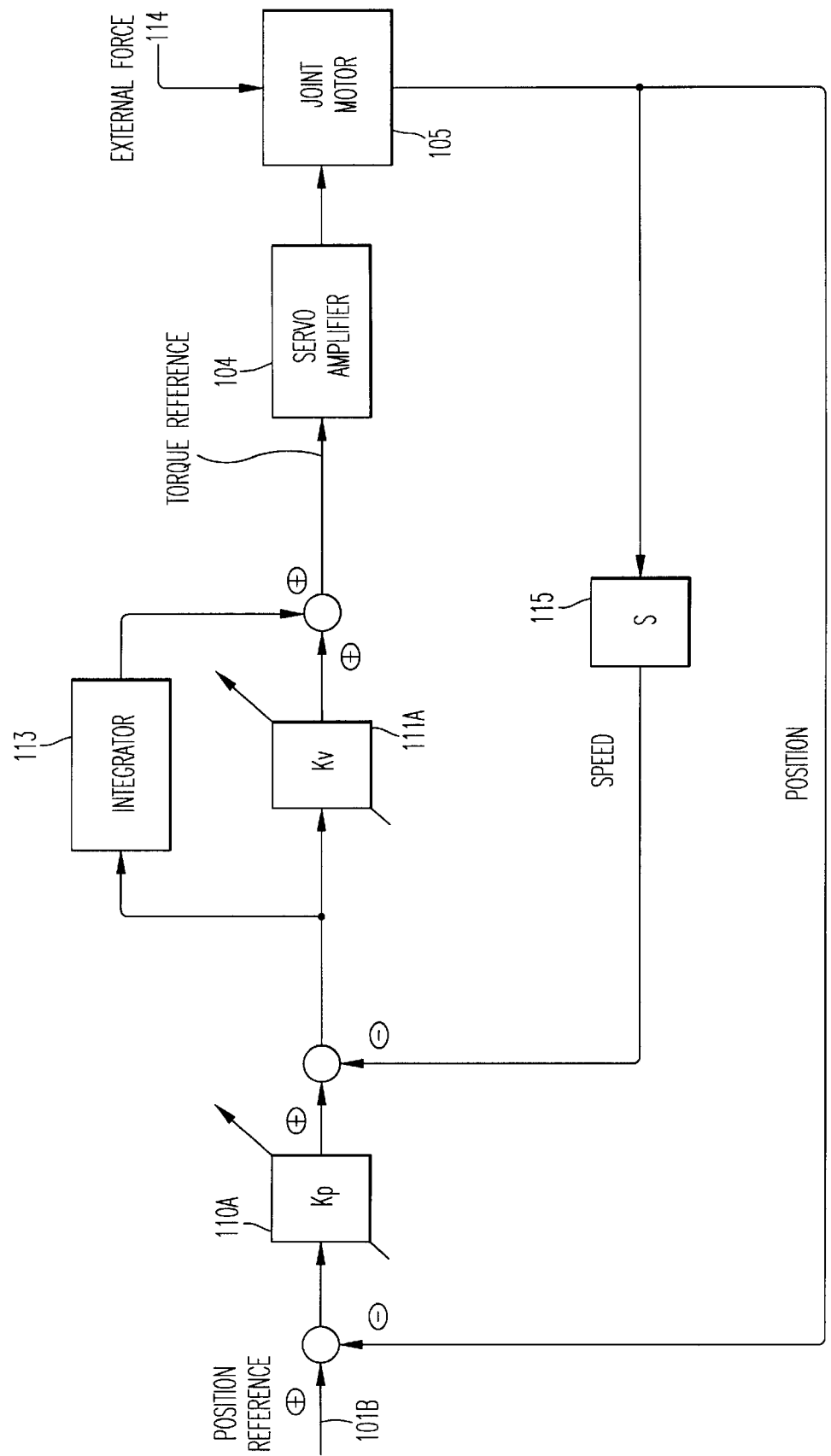
FIG. 2 is a block diagram showing a circuit constitution of a prior art No. 2.
Figure 3:
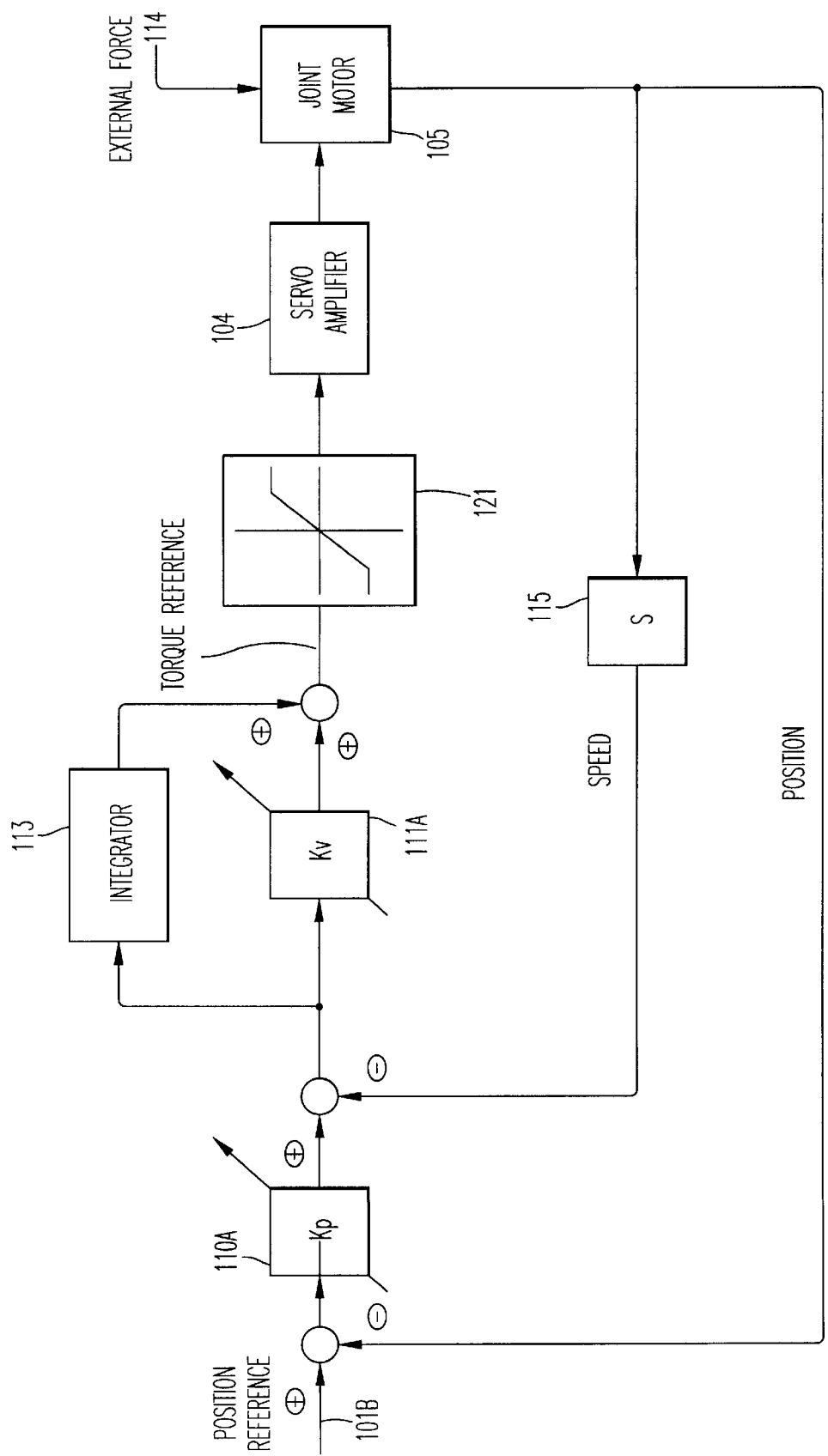
FIG. 3 is a block diagram showing a circuit constitution of a prior art No. 4.
Figure 4:
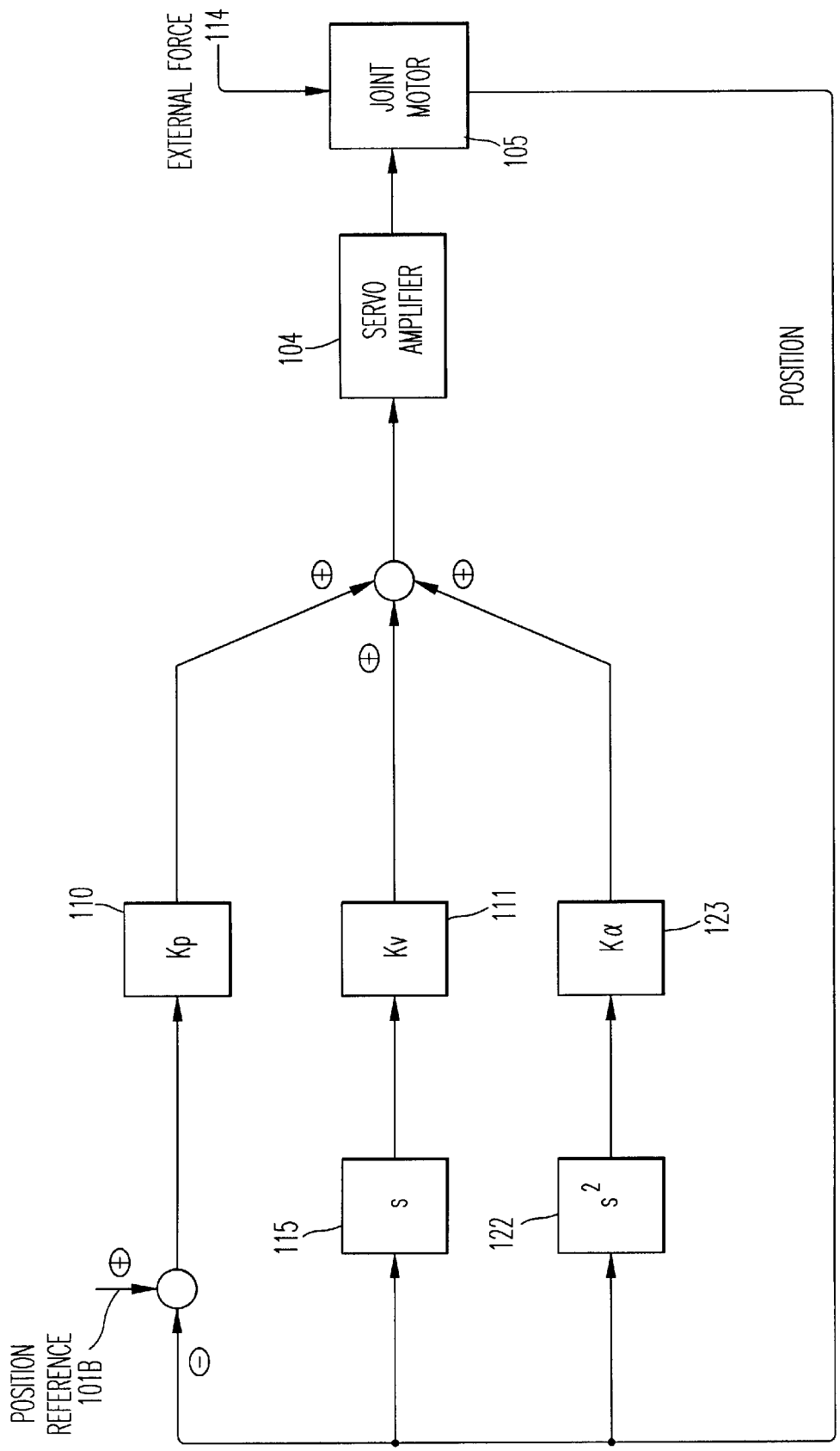
FIG. 4 is a block diagram showing a circuit constitution of a prior art No. 5.

The compliance control system as the fourth embodiment is a compliance control system in which an acceleration control loop is added to the prior art No. 2 shown in FIG. 2 or the prior art No. 4 shown in FIG. 3.

Figure 11:
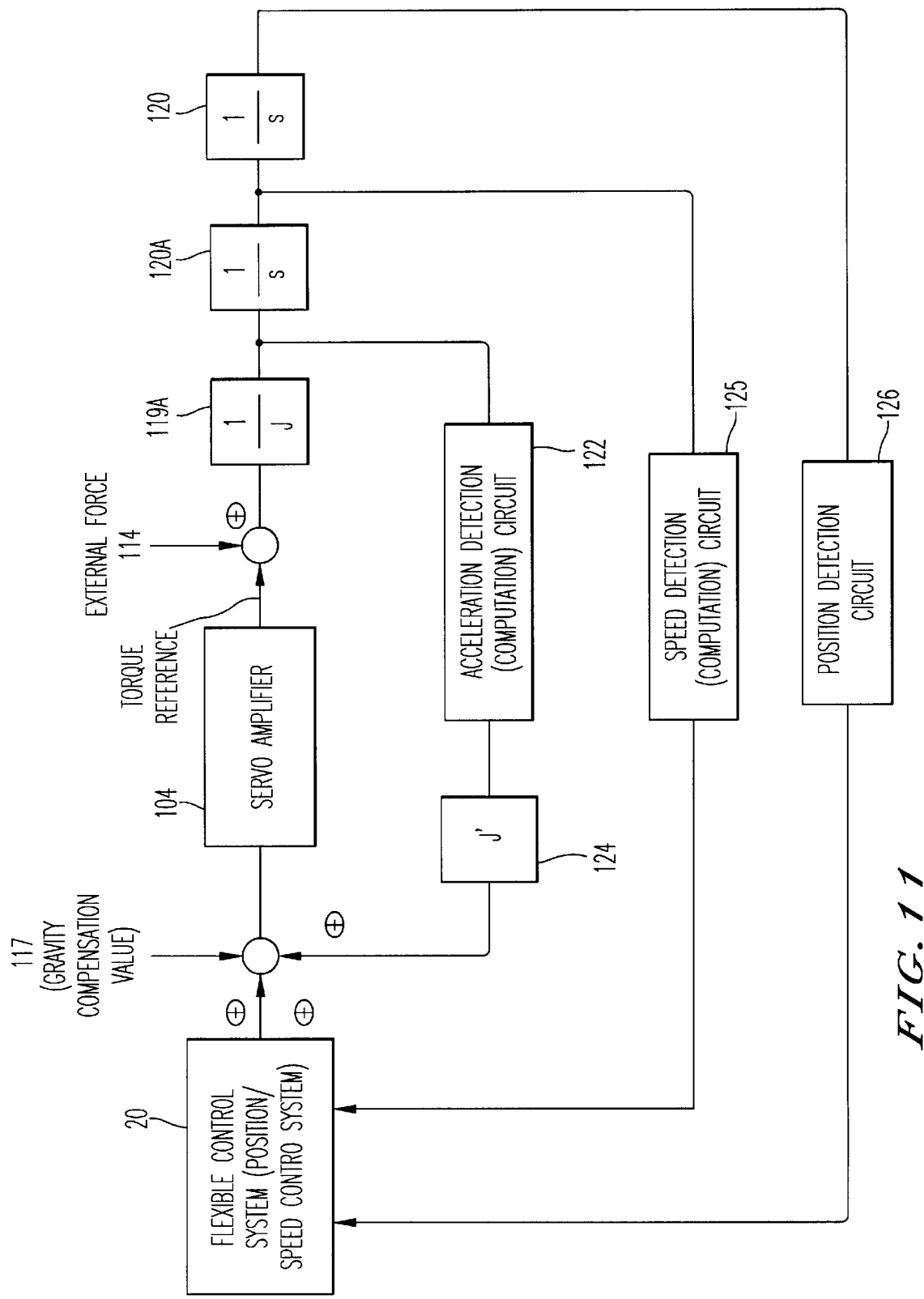
FIG. 11 is a block diagram showing a fundamental constitution in a fourth embodiment of the present invention.

FIG. 11 is a block diagram showing a summarized circuit constitution in the first means in the fourth embodiment.

Referring to FIG. 11, reference numeral 20 denotes a compliance control system (position/speed control system); 114, an external force; 119a, a robot; 120 and 120a, an integration circuit; 122, an acceleration detection (computation) circuit; 124, a rotation acceleration feedback gain [J'] circuit; 125, a speed detection (computation) circuit; and 126, a position detection circuit.

The first means comprises means capable of changing a position control gain and a speed control gain in a control system of the motor, and feedback control means which limits the output of the integrator during the proportional integration control in the speed control loop and adds the acceleration of the motor multiplied by a constant to a torque reference located at a rear stage of speed controller, and output therefrom is used as a torque reference.

Moreover, in the second means (FIG. 12 and FIG. 13), in the control system of the motor constituting the control loop similar to the first means, means are provided control the torque reference at the rear stage of the speed controller to a constant value, and feedback control means are provided which multiplies the acceleration of the motor by a constant. The output therefrom is used as a new torque reference.

Figure 12:
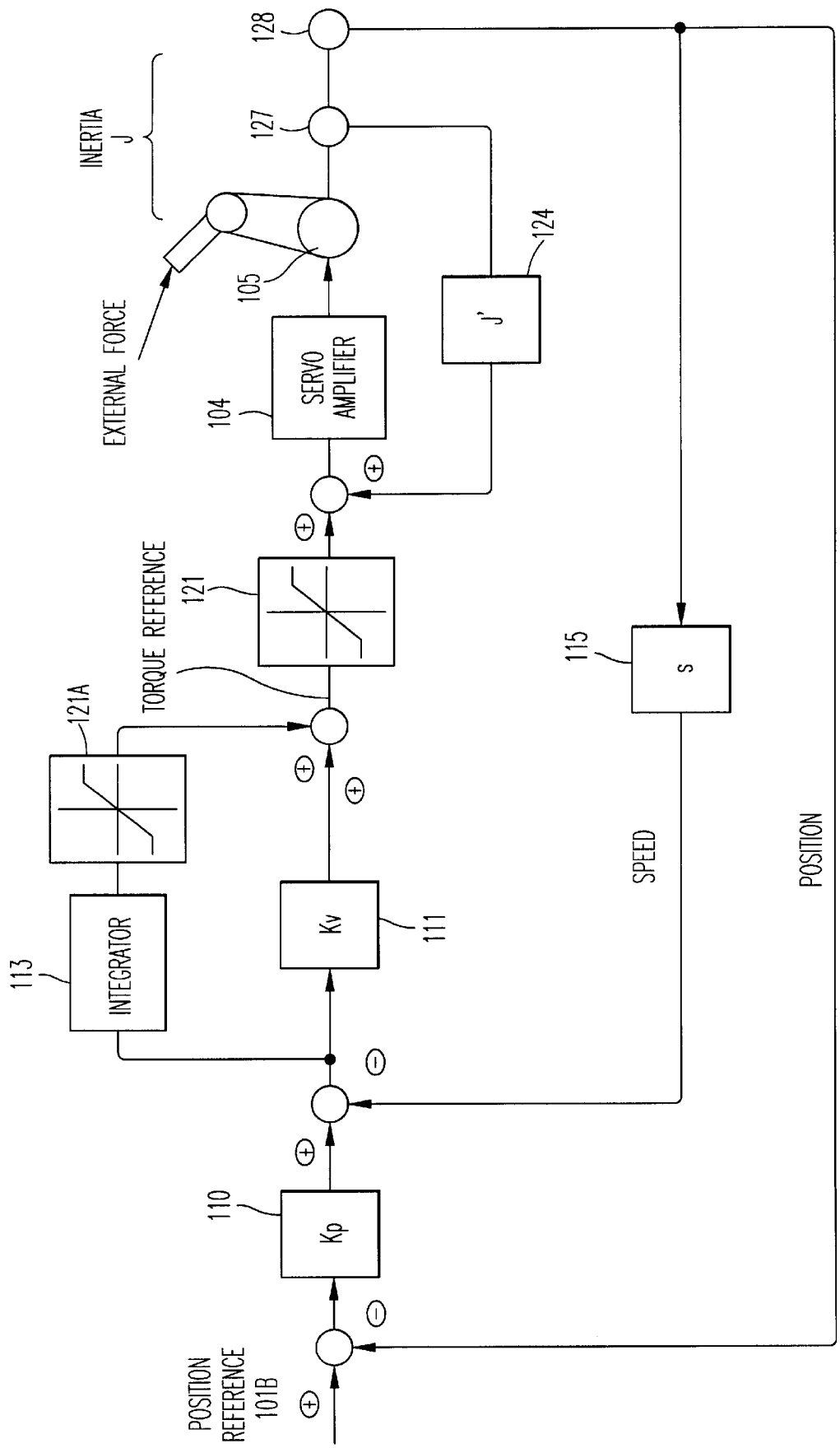
FIG. 12 is a block diagram showing one concrete circuit constitution in the fourth embodiment of the present invention.
Figure 13:
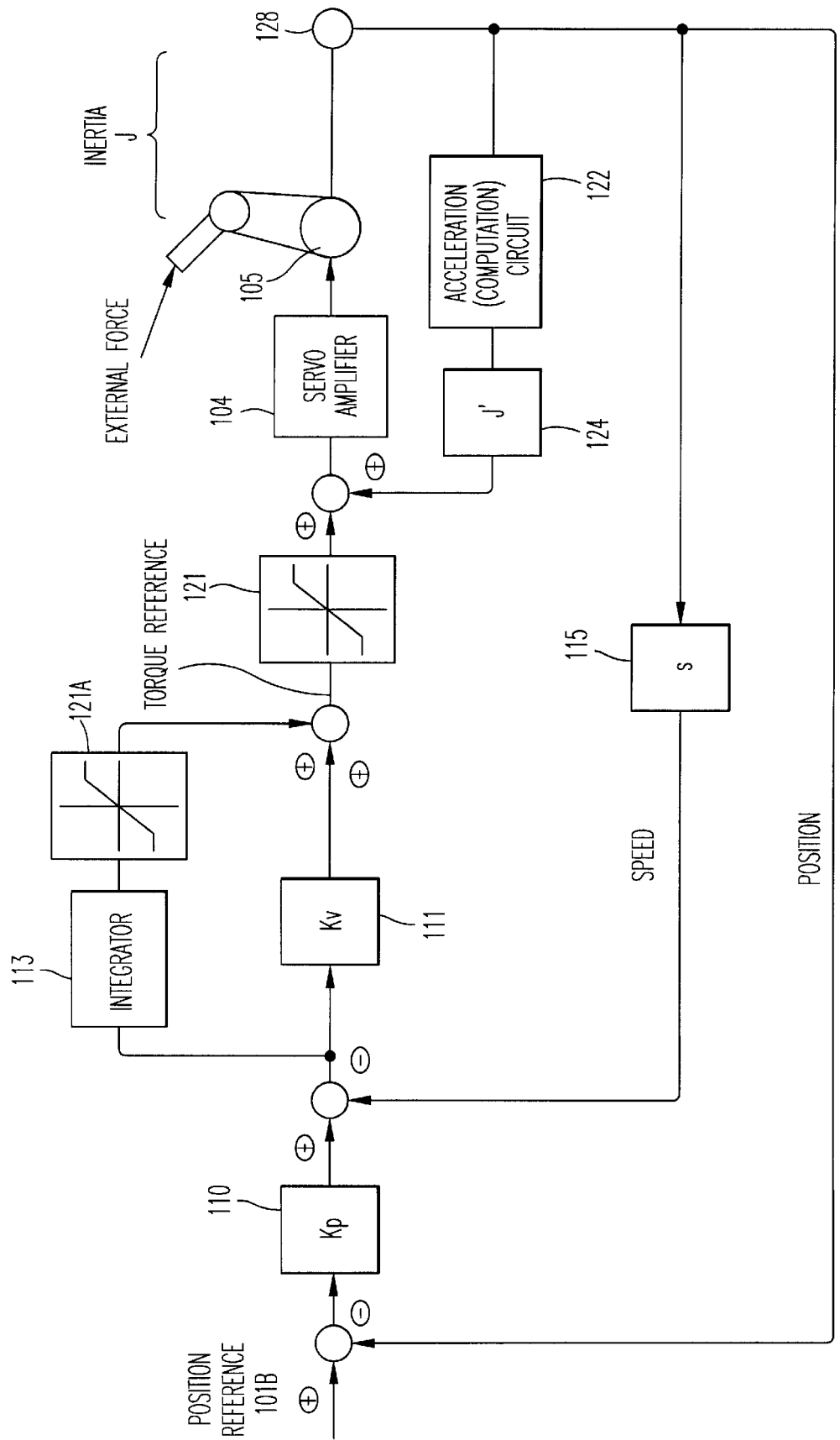
FIG. 13 is a block diagram showing another concrete circuit constitution in the fourth embodiment of the present invention.

Referring to FIG. 12 and FIG. 13, reference numeral 115 denotes a differentiater [speed detection means]; 121 and 121a, a torque limiter; 127, an acceleration detector; and 128, an encoder.

In the above described means, an integrator to compensate the gravity and the friction is used, and these values are limited so as not to damage the flexibility. It should be noted that the limitation to the integration value may be zero as long as they are compensated in the manner of the gravity compensation or they are negligible.

In the above described means, the acceleration can be detected directly by the detector or can be obtained by a difference of the position detector such as an encoder.

Moreover, the gravity torque is computed by a computation using parameters such as the mass and the position of a center of gravity of the robot, and added to the torque reference to be output to the amplifier, whereby the gravity torque is compensated.

The concrete circuit constitution of the embodiment 4 of the present invention will be described with reference to FIG. 12 and FIG. 13 below. Specifically, FIGS. 12 and 13 illustrate a concrete embodiment of a second method.

FIG. 12 shows a case where the rotation acceleration detector of the motor shaft is used as detection means for the acceleration and FIG. 13 shows means for computing the acceleration from the position detector by a computation. For the objective robot, an example in which the robot is applied to the first axis of the scalar type robot operating in a horizontal direction of two degrees of freedom is shown. It should be noted that the same control system can be constituted for the second axis.

It is assumed that an output of the position/speed controller of the motor is zero. Moreover, it is assumed that in both cases of FIGS. 12 and 13, a torque of T is acting on as an external force and inertias of the motor and the arm are collectively J. When it is further assumed that a feedback gain of the rotation acceleration of the control system is J' and the generated acceleration is α, the following formula (5) is established.

$$\alpha = T/(J-J') \quad (5)$$

Specifically, an apparent inertia is reduced more than the inherent inertia by an external force. It should be noted that although delays of the acceleration detection section and the amplification section shall be ignored, a little delay has no great effect on the inertia variation.

Next, a method for determining the feedback gain J' will be described.

In case of the robot of two degrees of freedom, the movement of the second axis changes the inertia viewed from the first axis. For this reason, the value of the real inertia J of the first axis will change, and the reduction quantity of the inertia by the control will be equal to the value determined by the feedback gain of the acceleration, so that a suitable value is determined considering the inertia variation of the movable range of the robot.

Specifically, the inertia J' will be determined so that J-J' has no negative value and the loop gain of the speed control loop makes as little variation as possible.

Moreover, in order to maintain the certain inertia regardless of the posture of the robot, J' is changed in accordance with the movement of the robot, whereby the apparent inertia can keep the constant value.

According to the above descriptions, the apparent inertia in case of an external force can be controlled to be small, thereby greatly increasing the flexibility compared to the case of the conventional compliance control. The fact that the apparent inertia can be controlled to be small implies that the action force is made small when the robot would collide with a body around it. For this reason, the safety at the time of robot control can be enhanced.

In addition, since the structure of the control system is not fundamentally different from the conventional position/speed control system, it is not necessary to modify the structure of the control system when the transitions from the compliance control system to the position control system and from the position control system to the compliance control system are conducted.

Therefore, the control quantity is changed continuously even when the transition of the control system is conducted, whereby the movement of the robot arm is not rapid and discontinuous.

A detection method of the acceleration will be described. A rotation acceleration sensor directly connected to the motor is mentioned as a direct detection method as shown in FIG. 12. Moreover, it is also possible to obtain an output of a multi-axis parallel acceleration sensor fitted to the robot by decomposing it in a rotation direction.

In addition, the following methods are mentioned besides the method other than acceleration detection detector as is shown in FIG. 13:

1) differentiation of a speed sensor such as a tacho-generator
2) differentiation after F/V conversion of an encoder signal, and
3) difference of the encoder signal.

Generally, it has been difficult to obtain a good acceleration signal. However, by using an increase of a recent encoder dissolution, a multi-point difference of a signal, and a virtual differentiator in which a frequency band is limited, it is possible to obtain an acceleration signal with precision and a good response.

In the description of the robot, the example is described, in which the robot of the scalar type moving in the horizontal direction is employed. When the robot has a movement component in the gravity direction, the component in the gravity is compensated by a computation as shown in FIG. 11 and the friction is compensated by detecting the speed, whereby the compliance control system can be constituted.

(Embodiment No. 5)

The fifth embodiment concerns means which monitors a deviation of the position in the compliance control, and is capable of performing an emergency stop for the robot, of outputting information to a peripheral equipment of the compliance control apparatus of a robot, of avoiding a danger based on an operation schedule change, and of monitoring an external force.

One example of the fifth embodiment of the present invention will be described with reference FIG. 14.

Figure 14:
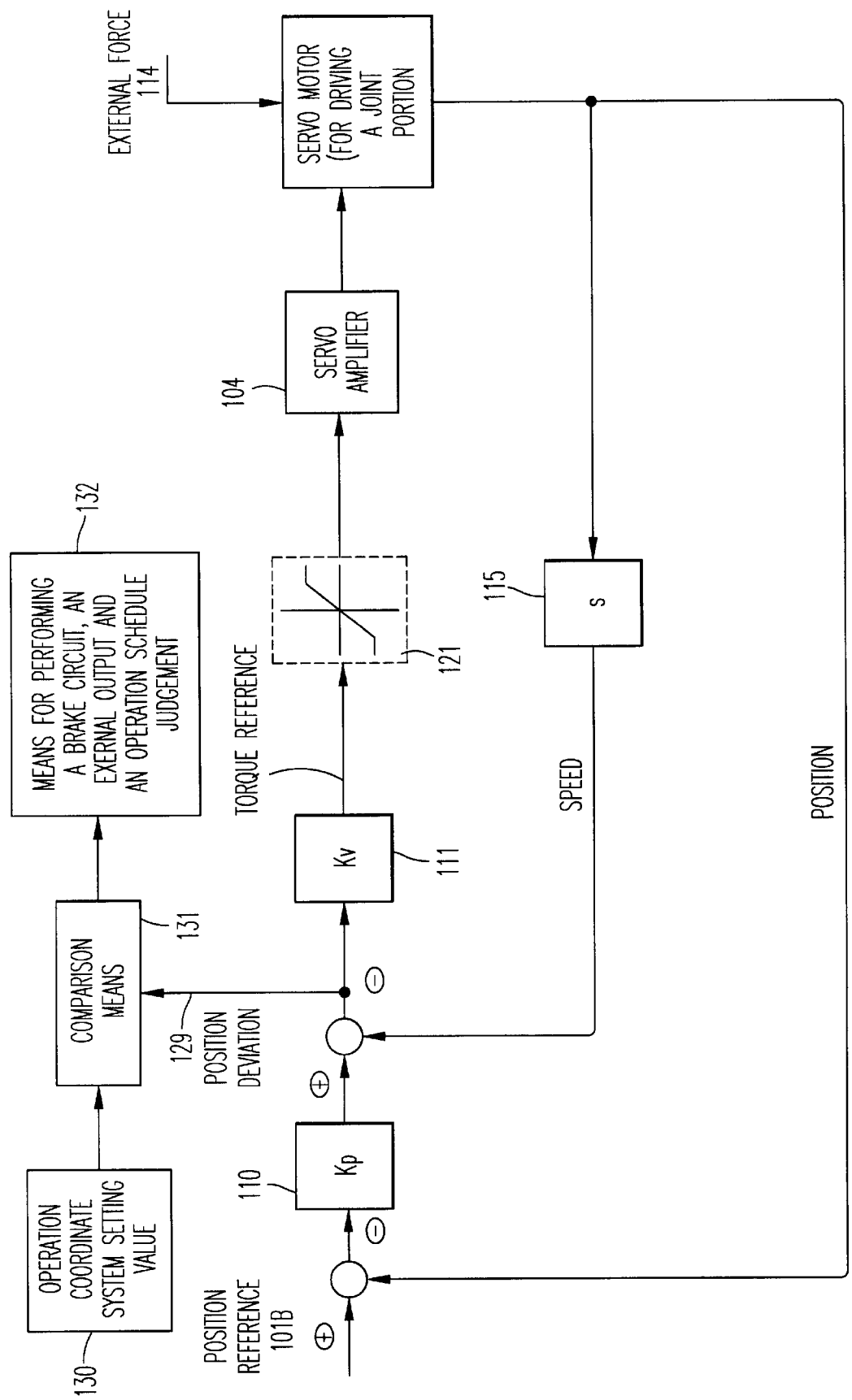
FIG. 14 is a block diagram for explaining a function in a fifth embodiment of the present invention.

FIG. 14 is a block diagram illustrating a circuit diagram which shows a portion of one axis of the control system of the motor or one direction of the working coordinate system thereof.

Referring to FIG. 14, reference numeral 129 denotes a position deviation; 130, a working coordinate system setting value; 131, comparison means; and 132, means for performing a brake circuit, an external output and an operation schedule judgment.

Here, the compliance control as described for the prior art shall be performed. Specifically, Kp and Kv that are a position control gain and a speed control gain shall be reduced or the torque limitation shall be executed.

Thus, the robot makes a posture change in accordance with the force from the load side on the robot. This implies that the robot assumes the posture which is deviated from a position reference of the control system. Therefore, the deviation quantity can be obtained from the deviation between each of the servo motor angles and the reference value.

The above explanation is for the case of the rotation axis change.

Also by using
1) a working coordinate system servo,
2) a reference value before an order conversion of the joint angle and a reverse conversion, or
3) a static torque relation changed by a posture of the robot (Jacobian's matrix) between the joint angle and the operation coordinate system servo, it is possible to obtain the deviation between each of the servo motor angles and the reference value in the coordinate system other than the joint coordinate system.

By comparing the deviation obtained with the predetermined fixed angular deviation quantity threshold as described above, the judgment whether a safe operation is being performed is conducted. When the deviation value is larger than the fixed angular deviation quantity threshold, the operation state is not judged to be safe, and any of the following processes are executed.

The processes are different based on the kinds of performed. The following processes are performed. Specifically, an emergency stop of the robot is performed, a signal is sent to a peripheral equipment of the compliance control apparatus of a robot using an input/output contact of the robot and the peripheral equipment takes a safe measure to stop an operation or operate to evade based on large or small deviation values, and condition branching of robot software is performed depending on information of the deviation.

Particularly, the transition to the normal operation is made when no problem occurs.

Moreover, besides the foregoing judgment for the extraordinary state, the following processes are performed in accordance with the external force. Specifically, the force acting on the top of the robot is estimated based on the information of the deviation, and the selection of the body held is performed, and the operation pattern of the robot is changed by the body held.

Figure 15:
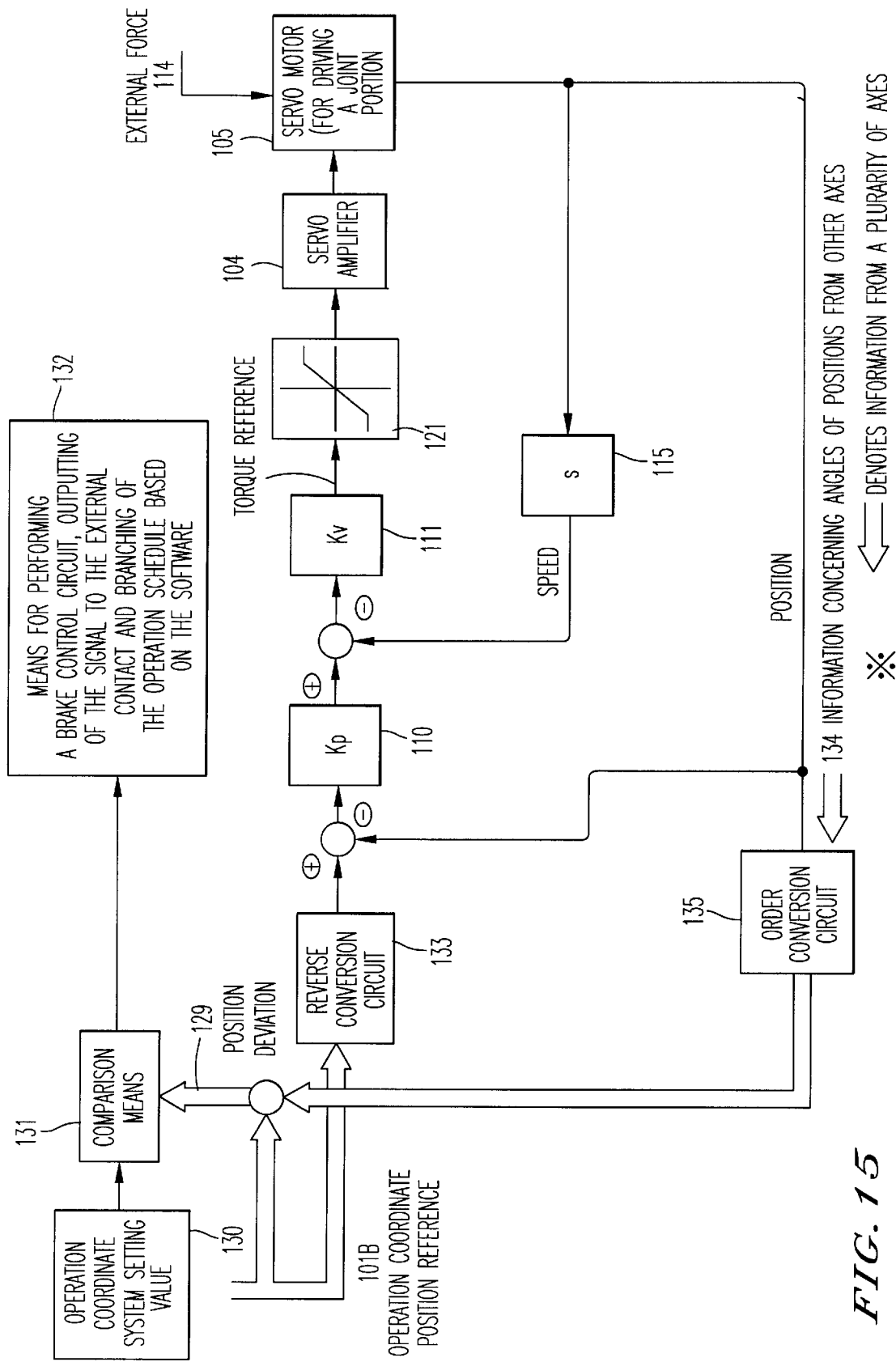
FIG. 15 is a block diagram showing a concrete circuit constitution in the fifth embodiment of the present invention.

One example of a circuit constitution of a control system which is applied to a robot of multi-degrees of freedom to monitor the deviation of a plurality of coordinates in the working coordinate system is shown in FIG. 15.

Referring to FIG. 15, reference numeral 133 denotes a reverse conversion circuit; 134, information concerning angles or positions from other axes; and 135, an order conversion circuit.

In a case where the deviation is obtained in a working coordinate system, FIG. 15 illustrating another example of the fifth embodiment of the present invention constitutes a servo system of a working coordinate system, and the method to obtain the deviation can be constituted most simply. Here, a constitution of an industrial robot which utilizes a joint position servo system used therein most generally is shown in FIG. 15.

In FIG. 15, the working coordinate position reference is usually taken on the Cartesian coordinate system based on the base of the robot, and some deviations of the parallel quantity and the posture quantity are compared with the fixed angular deviation quantity threshold.

From the comparison results, the following processes of 1) and 3) are selectively performed or a plurality of operations are simultaneously conducted:
1) An execution of an emergency stop by a brake of the axes of the robot,
2) Outputting of the signal to the external contact, and/or
3) Branching of the operation schedule based on the software.

Figure 16:
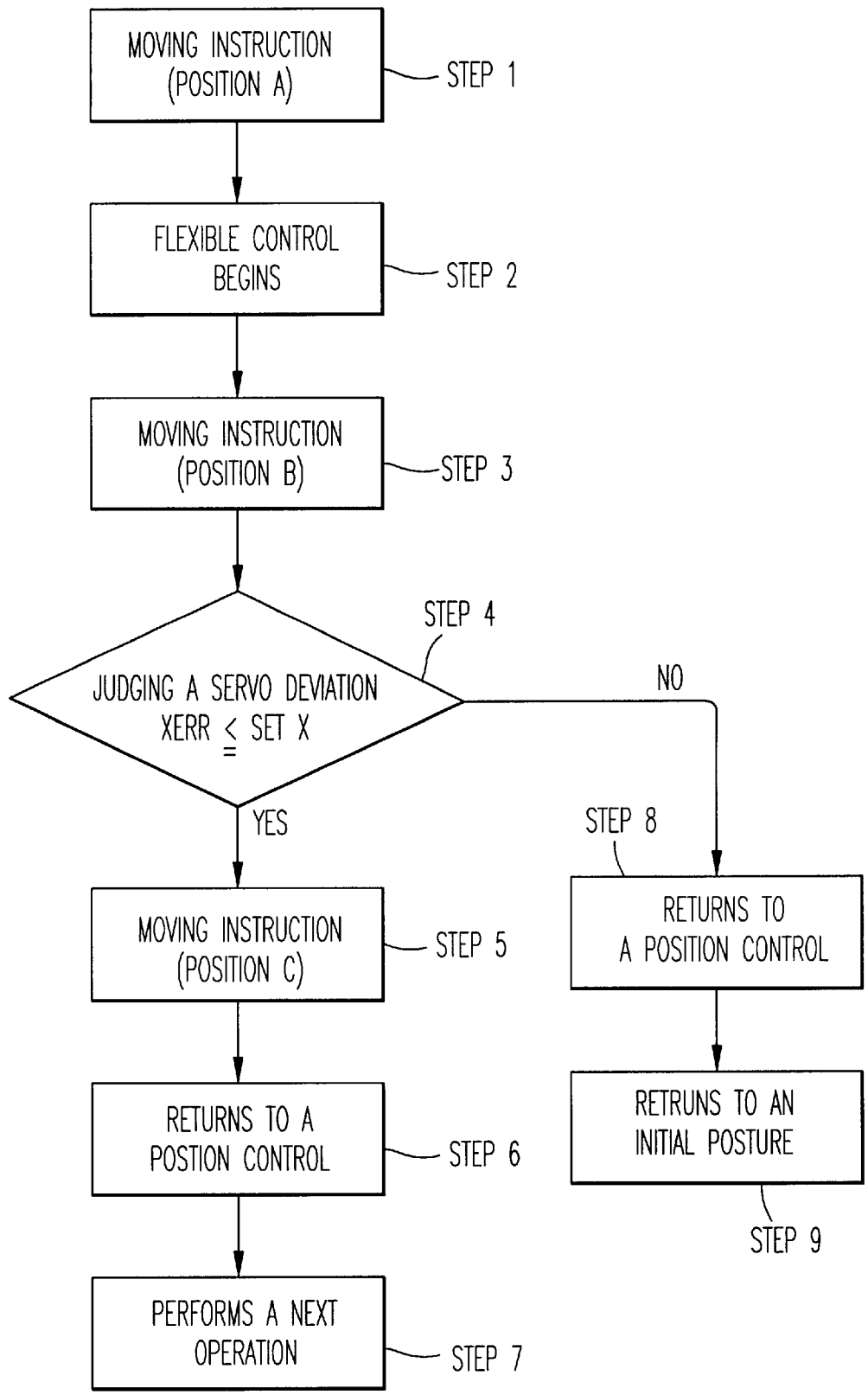
FIG. 16 is a flow chart showing an operation of the concrete circuit constitution in the fifth embodiment of the present invention.

FIG. 16 shows an example when the operation schedule is changed by the software.

After the operation is performed in the position control [step 1], the transition to the compliance control is made [steps 2 and 3], and the servo deviation during the compliance control is monitored [step 4].

In a case where the deviation (XERR) is larger than the fixed angular deviation quantity threshold (set X), it is judged that the unusual state of collision of the robot with the body occurs [step 8], whereby the robot returns to the initial posture [step 8].

When the operation is performed normally [step 5], specifically, when an excessive deviation is not produced [step 5], the process advances to the scheduled operation [steps 6 and 7].

(Embodiment No. 6)

The sixth embodiment concerns means for detecting an abnormal state such as contacting and nipping of the robot from the control state quantity, in the compliance control of the robot, changing and lowering the control gain and the torque limitation value to facilitate the escape by a human power, thereby compensating the gravity and the friction.

Figure 17:
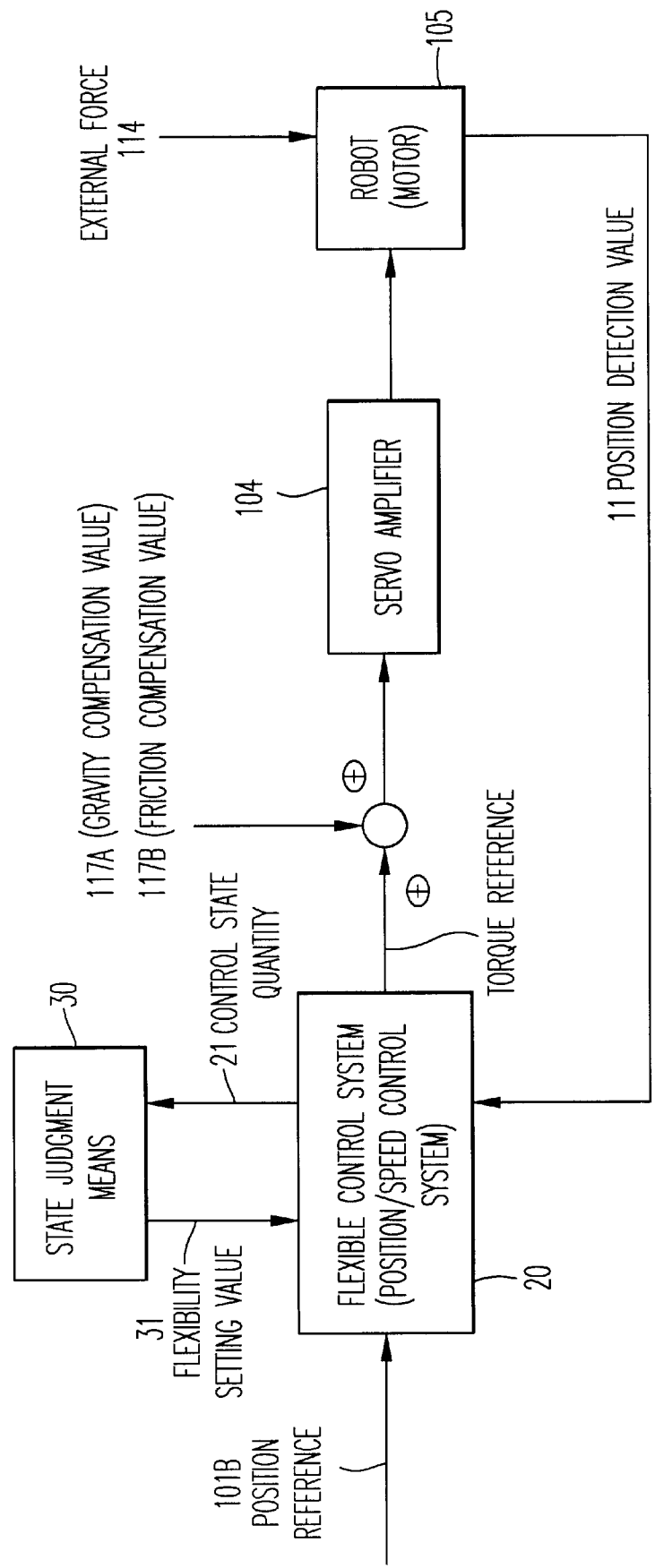
FIG. 17 is a block diagram showing a fundamental constitution in a sixth embodiment of the present invention.

FIG. 17 is a block diagram showing a fundamental constitution in the sixth embodiment of the present invention.

Referring to FIG. 17, reference numeral 11 denotes a position detection value; 20, a compliance control system (position/speed control loop); 21, a control state quantity; 30, state judgment means; 31, a flexibility setting value; 117*a*, a gravity compensation value; and 117*b*, a friction compensation value.

A circuit constitution of the sixth embodiment of the present invention will be described by showing it in FIGS. 18 and 19 concretely.

Figure 18:
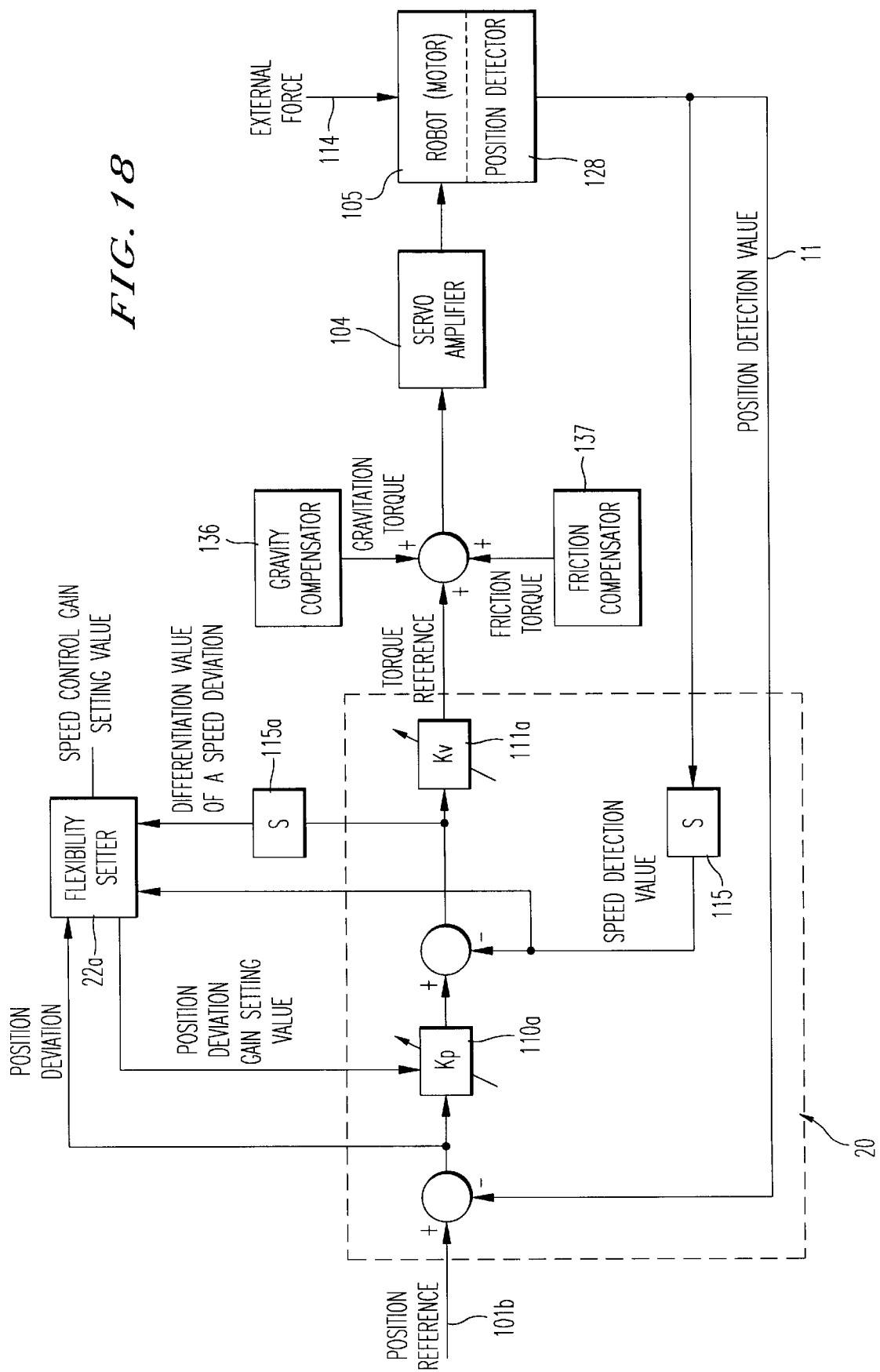
FIG. 18 is a block diagram showing one concrete circuit constitution in the sixth embodiment of the present invention.

FIG. 18 shows an apparatus using means for changing a position control gain and a speed control gain in the compliance control system. FIG. 19 shows a system using means for lowering a torque limitation value as the compliance control.

In FIG. 18, by the position reference input from the upper controller (not shown) and a position detector 128 provided in each of the joint portions of the robot, the torque reference (generation torque) of the motor in the compliance control system 20 is computed based on the position detection value and the speed detection value 11 via the differentiator 115. It should be noted that reference numeral 22*a* denotes a flexibility setter; 136, a gravity compensator; and 137, a friction compensator.

When a normal compliance control is performed, the minimum position control gain setting value and a minimum speed control gain setting value are computed in the flexibility setter 22*a*, which are necessary to normally operate the arm of the robot, thereby setting them to a variable position control gain 111*a* and a variable speed control gain 111a. Here, by adding the compensation torque of the gravity acting on each of the arms computed within the gravity compensator 136 from the position of the joints, the distance from the position of a center of gravity of each of the arms to the position of corresponding one of the joints and each weights of the arms, and the compensation torque of the friction acting on the driving portion of each joint computed within the friction compensator 37 from the speed detection value of each joint, to the torque reference that is an output of a proportional control within the speed control loop, the torque reference output from the compliance control system can be made smaller.

The torque reference after being subjected to the adding processing is amplified by the servo amplifier 104, thereby driving the robot 105. Here, the differentiation value of the position deviation, the speed detection value, and the speed deviation that are the control state quantities within the compliance control system 20 are continuously monitored by the flexiblity setter 22a. When it is judged that the operation of the robot is abnormal, the position control gain setting value and the speed control gain setting value are made minimum or zero, thereby setting them to the variable position control gain 111a and the variable speed control gain 111b.

Figure 20:
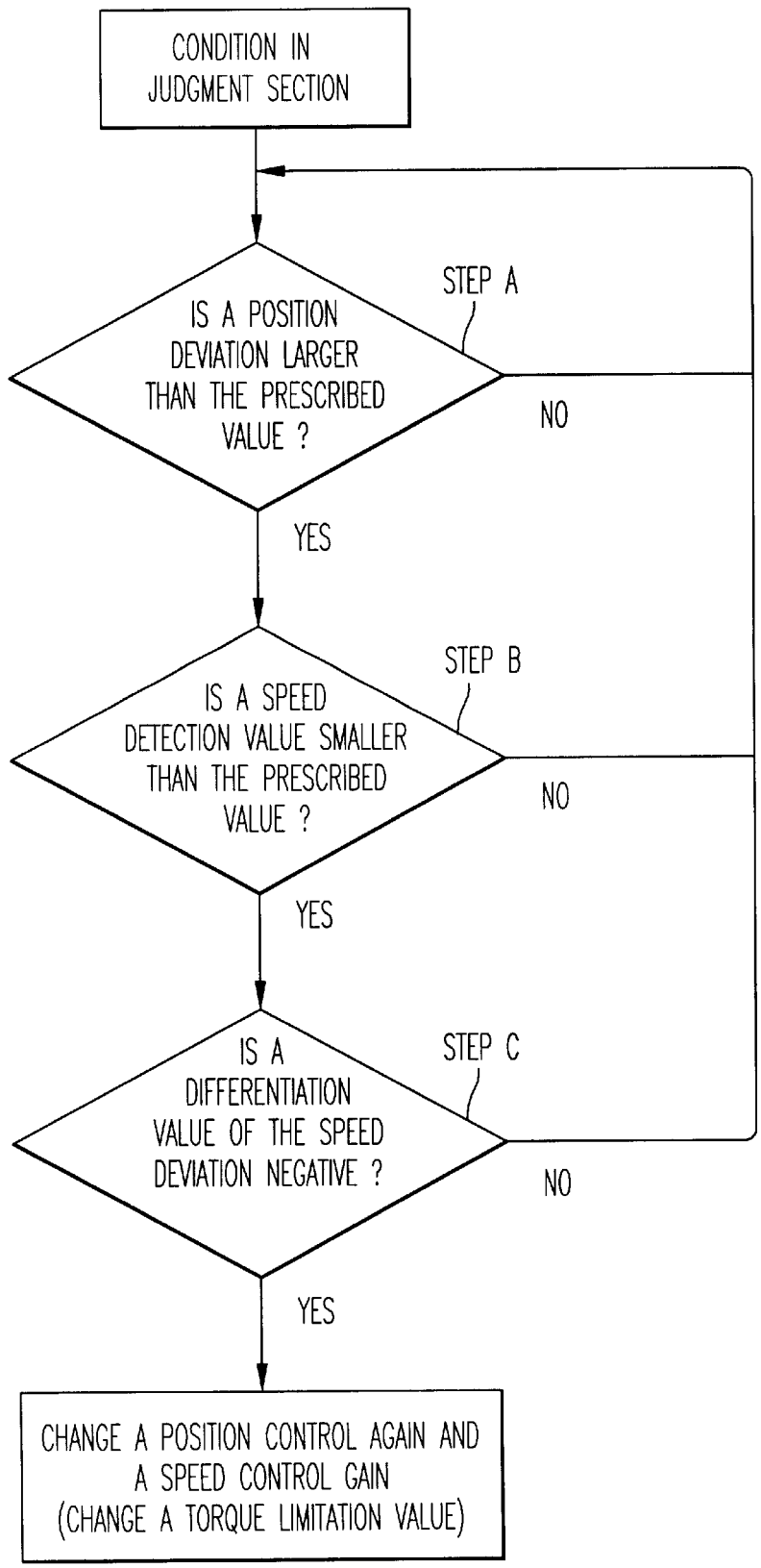
FIG. 20 is a flow chart showing a judgment for conditions in the sixth embodiment of the present invention.

A judgment flow of the control system constituted as described above will be described in reference to FIG. 20.

For example, when the arm of the robot 105 makes contact with the operator or other bodies or when the operator is caught by the arm of the robot, the external force acts on the robot 105 so that the robot 105 starts to change its posture from the position reference. Thus, the position deviation increases [step A], the speed detection value decreases [step B], and a sign of the differentiation value (acceleration) of the speed deviation becomes negative [step C].

At this time, when the position deviation becomes larger than the prescribed value previously set [YES at step A], the speed detection value becomes smaller than the prescribed value [YES at step B], and the differentiation value of the speed deviation becomes negative [YES at step C], it is determined that the abnormal state is detected. The position control gain setting value and the speed control gain setting value are made minimum or zero so as to reduce the flexibility of the compliance control system, thereby setting them to the variable position control gain 111a and the variable speed control gain 111a.

Thus, the torque reference of the motor from the compliance control system becomes minimum or zero, and the robot becomes stationary keeping the posture at the time when the determination for the abnormal state is made. At this time, adding the gravity torque and the friction torque to the torque reference, the robot 105 never falls down from gravity, and the operator can operate the robot 105 by human power after the robot becomes stationary.

Figure 19:
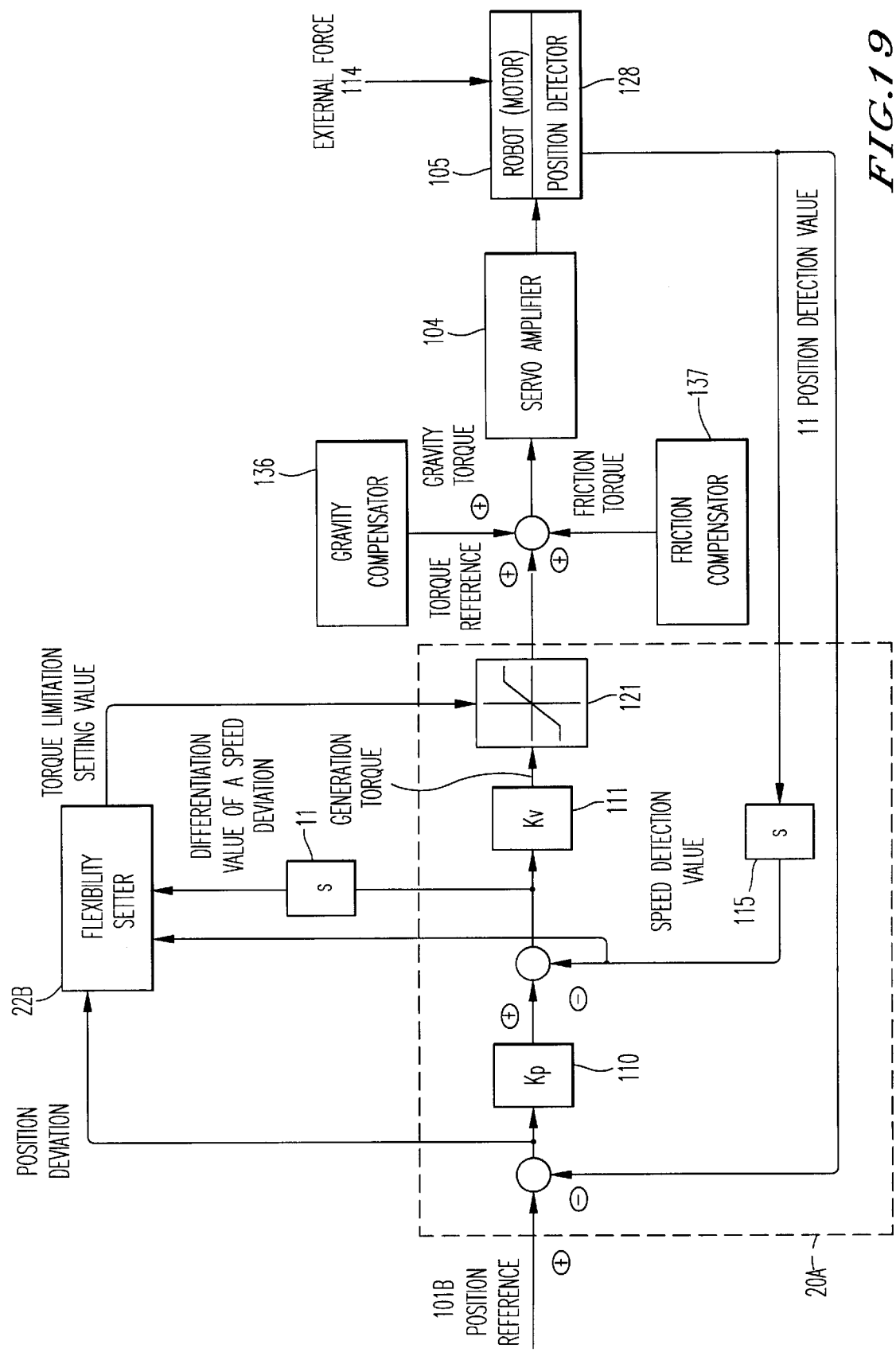
FIG. 19 is a block diagram showing another concrete circuit constitution in the sixth embodiment of the present invention.

Also in a case where the torque limiter 121 is provided in the compliance control system 20a of FIG. 19, the same effects as the case of FIG. 18 can be obtained.

Correlation among the embodiments of the present invention described above will be described additionally.

The second embodiment includes means which comprises a fundamental conception of the flexible compliance control of the robot of the prior art No. 2 [Japanese Patent Application Laid Open No. 6-332538], the fourth embodiment is applicable to the third embodiment and the prior art No. 2, the fifth embodiment is applicable to the second through fourth embodiments, and the sixth embodiment is applicable to the third through fifth embodiments and the prior art No. 2.

INDUSTRIAL APPLICABILITY

As described above, according to the present invention, the following described effects described are realized.

The smooth transition between the compliance control and the position control will be possible. As a result, the operation in which the precise positioning is required after taking out the body flexibly and a fitting operation for the body such as an insertion after holding the body can be performed without using an exclusive jig for absorbing the force. As described above, the skillful operation utilizing the control characteristics in the position control and the compliance control will be possible.

Moreover, the present invention exhibits effects making the compliance control in the working coordinate system possible with simple coordinate conversion using the information of the position of the joint angle.

In this case, the two variables of positive and negative values can be set with one degree of freedom. Because of the simplicity of the conversion equation itself, the computation load is small, and the computation of the working coordinate system can be performed in real time.

Moreover, since the reaction force of the robot is constant, the stroke can be set to be large.

Furthermore, by adding the feedback of the acceleration information to the compliance control, it will be possible to perform the compensation of the inertia, thereby increasing the flexibility. In addition, the control system of the present invention keeps the fundamental constitution of the conventional one, and the transition between the position control and the compliance control will be performed smoothly.

As a result, the robot of the present invention exhibits characteristics possessed by no conventional robot. For example, at the time of the compliance control, the robot can be moved easily by a force from machinery or by hand. When the robot collides with the bodies around it, the robot never applies a large force to the body.

When compliance control is performed by the robot of the present invention, it will be possible to easily perform the processing for the abnormal state such as the deviation of the position of the works and collision of the robot with the body at the time of the locus control. Moreover, it is possible to perform an operation, such as a change of the work schedule based on the external force, which requires the use of sensors, without a sensor.

Further, according to the flexible control method of the present invention, the state change of the robot operation is judged from the control state quantity during the flexible control, and the flexibility of the flexible control system is changed. Therefore, even when the operator is caught, the robot stops immediately, and the force generated by the motor disappears. Thus, the robot secures the safety of the operator and the robot.

We claim:

1. A control apparatus for a robot comprising:

a position feedback control loop;

a speed feedback control loop; and means for switching between a position control and a compliance control during an operation of the robot;

wherein said means for switching is performed by limiting an output value of a speed control loop, which is a torque reference value; and when a transition from the position control to the compliance control is made, an integration operation of the speed control loop is stopped, an integration value of the speed control loop is subsequently stored in a memory and, at the same time, one of the integration value of the speed control loop is added to a torque reference, and a gravity compensation value computed based on a joint angle of a robot arm, a link mass of the robot and a center of gravity thereof is added to the torque reference.

2. The control apparatus of a robot according to claim 1, wherein in case of an operation of the robot to hold a workpiece, a mass of the workpiece is added to said gravity compensation value.

3. A control apparatus of a robot comprising:

means for switching between a position control and a compliance control during an operation of the robot;

wherein when a switch is made to the position control from the compliance control, a present position is handled as a position reference.

4. The control apparatus which comprises means for switching between the position control and the compliance control during the operation of the robot according to claim 2, wherein when a switch is made from the compliance control to the position control, one of a gravity compensation value computed based on an actual joint angle of a robot arm, a link mass of the robot and a position of a center of gravity thereof, and an integration value of the speed control loop stored in said memory is set as a new integration value of said speed control loop.

5. The control apparatus of a robot according to claim 3, wherein the switching between said position control and said compliance control is performed by limiting an output value of the speed control loop, which is a torque reference value.

6. A compliance control apparatus of a robot comprising:

means for controlling a torque of a servo motor which drives a joint portion of the robot;

means for measuring a joint angle of said joint portion;

means for computing a static torque relation changed by a posture of the robot between coordinate systems, based on information of said joint angle obtained by said measuring;

means for converting a limitation value of one of a force vector and the torque in a working coordinate system to a joint torque limitation value by using said static torque relation changed by a posture of the robot; and means for limiting an output torque of the servo motor which drives a joint portion of the robot using said joint torque limitation value.

7. The compliance control apparatus of a robot according to claim 6, wherein by using a reference value of said joint angle of a control system of a servo motor which drives the joint portion of the robot, said static torque relation changed by a posture of the robot between a working coordinate system and a joint coordinate system is obtained.

8. A compliance control apparatus of a robot which comprises a control system of a servo motor to drive a joint portion of the robot having a position control loop and a speed control loop, comprising:

means which is capable of varying position and speed control gains;

means for limiting an integration value at an integrator in said speed control loop;

means for obtaining a rotation acceleration of said servo motor either by detecting or by computing; and feedback control means for multiplying the acceleration of said servo motor by a constant at a rear stage of a speed controller.

9. A compliance control apparatus of a robot which comprises a control system of a servo motor to drive a joint portion of the robot having a position control loop and a speed control loop, comprising:

means for limiting an integration value at an integrator in said speed control loop;

a torque limiter which limits a torque reference that is a result obtained by adding the output of said integrator and a proportional control;

means for obtaining a rotation acceleration of said motor by at least one of detecting and computing; and feedback control means for multiplying an acceleration of said servo motor by a constant at a rear stage of said torque limiter.

10. The compliance control apparatus of a robot according to claim 8, further comprising:

means for compensating a torque reference which is a result obtained by adding an output of a speed controller and an integration control for either a gravity torque or a friction torque.

11. The compliance control apparatus of a robot according to claim 9, further comprising:

means for compensating a torque reference which is a result obtained by adding an output of a speed controller and an integration control for either a gravity torque or a friction torque.

12. A compliance control apparatus of a robot which comprises a control system of a servo motor of the robot having a position control loop and a speed control loop, comprising:

means for comparing a difference between a target angle of a position and a present angle of a servo motor with a setting value; and means for stopping, a movement of said servo motor based on a comparing result.

13. A compliance control apparatus of a robot which comprises a control system of a servo motor of the robot having a position control loop and a speed control loop, comprising:

means for comparing a difference between a target angle of a position and a present angle of a servo motor with a predetermined fixed angular deviation quantity threshold, and means for outputting a comparing result from the compliance control apparatus of a robot to a peripheral equipment of the compliance control apparatus of a robot.

14. A compliance control apparatus of a robot which comprises a control system of a servo motor of the robot having a plurality of position control loops and speed control loops, comprising:

means for comparing a difference between a target value in a working coordinate system and a present value in a working coordinate system obtained from a present value of said servo motor with a predetermined fixed positional deviation quantity threshold and a predetermined fixed posture deviation quantity threshold; and means for stopping a movement of said servo motor based on a comparing result.

15. A compliance control apparatus of a robot which comprises a control system of a servo motor of the robot having a plurality of position control loops and speed control loops, comprising:

means for comparing a difference between a target value in a working coordinate system and a present value in a working coordinate system obtained from a present value of said servo motor with a predetermined fixed positional deviation quantity threshold and a predetermined fixed posture deviation quantity threshold; and means for outputting a comparing result from the compliance control apparatus of a robot to a peripheral equipment of the compliance control apparatus of a robot.

16. A compliance control apparatus of a robot which comprises a control system of a servo motor to drive a joint portion of the robot, having a position control loop and a speed control loop, comprising:

means for changing a position control gain and a speed control gain; and means for lowering said position control gain and said speed control gain based on reference information concerning a position, a speed and a direction, sensor information of an encoder attached to a robot, and a computation result using said information.

17. A compliance control apparatus of a robot which comprises a control system of a servo motor to drive a joint portion of the robot having a position control loop and a speed control loop, comprising:

means for limiting a torque reference that is an addition result of outputs of a proportional control and an integrator; and means for changing the means for limiting said torque reference based on instruction information concerning a position, a speed and a direction, sensor information of an encoder attached to a robot, and a computing result using said information.

18. The compliance control apparatus or a robot according to claim 16, further comprising:

means for compensating at least one of a gravity torque and a friction torque after adding a proportional control and an integration control in said speed control loop.

19. The compliance control apparatus of a robot according to claim 17, further comprising:

means for compensating at least one of a gravity torque and a friction torque after adding a proportional control and an integration control in said speed control loop.

* * * * *